United States Patent
Ito et al.

(10) Patent No.: US 8,463,809 B2
(45) Date of Patent: Jun. 11, 2013

(54) METHOD AND COMPUTING SYSTEM FOR DISTRIBUTED STREAM DATA PROCESSING USING PLURAL OF COMPUTERS

(75) Inventors: Daisuke Ito, Fuchu (JP); Shinji Fujiwara, Sagamihara (JP); Itaru Nishizawa, Koganei (JP); Akinori Asahara, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 430 days.

(21) Appl. No.: 12/562,516

(22) Filed: Sep. 18, 2009

(65) Prior Publication Data

US 2011/0029554 A1 Feb. 3, 2011

(30) Foreign Application Priority Data

Jul. 31, 2009 (JP) ................................. 2009-178561

(51) Int. Cl.
*G06F 17/30* (2006.01)
(52) U.S. Cl.
USPC ........................... 707/769; 707/803; 709/231
(58) Field of Classification Search
USPC ................ 707/999.3, 769, 802, 803; 709/231
See application file for complete search history.

(56) References Cited

U.S. PATENT DOCUMENTS

| | | | | |
|---|---|---|---|---|
| 7,739,331 | B2* | 6/2010 | Gu et al. | 709/203 |
| 7,991,766 | B2* | 8/2011 | Srinivasan et al. | 707/714 |
| 8,019,747 | B2* | 9/2011 | Srinivasan et al. | 707/713 |
| 8,180,801 | B2* | 5/2012 | Zhang et al. | 707/792 |
| 2006/0277230 | A1* | 12/2006 | Nishizawa et al. | 707/204 |
| 2007/0022092 | A1 | 1/2007 | Nishizawa et al. | |
| 2007/0288635 | A1* | 12/2007 | Gu et al. | 709/226 |
| 2008/0016095 | A1* | 1/2008 | Bhatnagar et al. | 707/101 |
| 2008/0275891 | A1* | 11/2008 | Park et al. | 707/100 |
| 2009/0106189 | A1* | 4/2009 | Jain et al. | 707/2 |
| 2009/0112853 | A1* | 4/2009 | Nishizawa et al. | 707/5 |
| 2009/0182779 | A1* | 7/2009 | Johnson | 707/200 |
| 2009/0228434 | A1* | 9/2009 | Krishnamurthy et al. | 707/2 |
| 2009/0271529 | A1* | 10/2009 | Kashiyama et al. | 710/1 |
| 2011/0016160 | A1* | 1/2011 | Zhang et al. | 707/805 |

OTHER PUBLICATIONS

Madden, Samuel, et al., "Continuously Adaptive Queries over Streams", ACM SIGMOD 2002, Madison, WI, Jun. 4-6, 2002, pp. 49-60.*
Arasu, Arvind, et al., "CQL: A Language for Continuous Queries over Streams and Relations", DBPL 2003, LNCS 2921, Springer-Verlag, Berlin, Germany, © 2004, pp. 1-19.*
Wei, Yuan, et al., "RTSTREAM: Real-Time Query Processing for Data Streams", ISORC 2006, Gyeongju, Korea, Apr. 24-26, 2006, 10 pages.*
Arasu, Arvind, et al., "Characterizing Memory Requirements for Queries Over Continuous Data Streams", ACM Transactions on Database Systems, vol. 29, No. 1, Mar. 2004, pp. 162-194.*
Arvind Arasu et al. ("CQL: A Language for Continuous Queries over Streams and Relations", DBPL 2003, LNCS 2921, Springer-Verlag, Berlin, Germany, © 2004, pp. 1-19.*
A. Arasu et al., STREAM: The Stanford Stream Data Manager, IEEE Data Engineering Bulletin, vol. 26, 2003, pp. 1-8.

* cited by examiner

*Primary Examiner* — Shahid Alam
*Assistant Examiner* — Andalib Lodhi
(74) *Attorney, Agent, or Firm* — Mattingly & Malur, PC

(57) ABSTRACT

In executing query distributed processing in a computer system having a plurality of computers, a query and a sliding window are inherited between different computers. If a tuple having a new principal key value is detected when a query is to be executed, a relevant individual query and a relevant sliding window are inherited between computers, and further a sliding window of a relevant common query is inherited between computers.

20 Claims, 19 Drawing Sheets

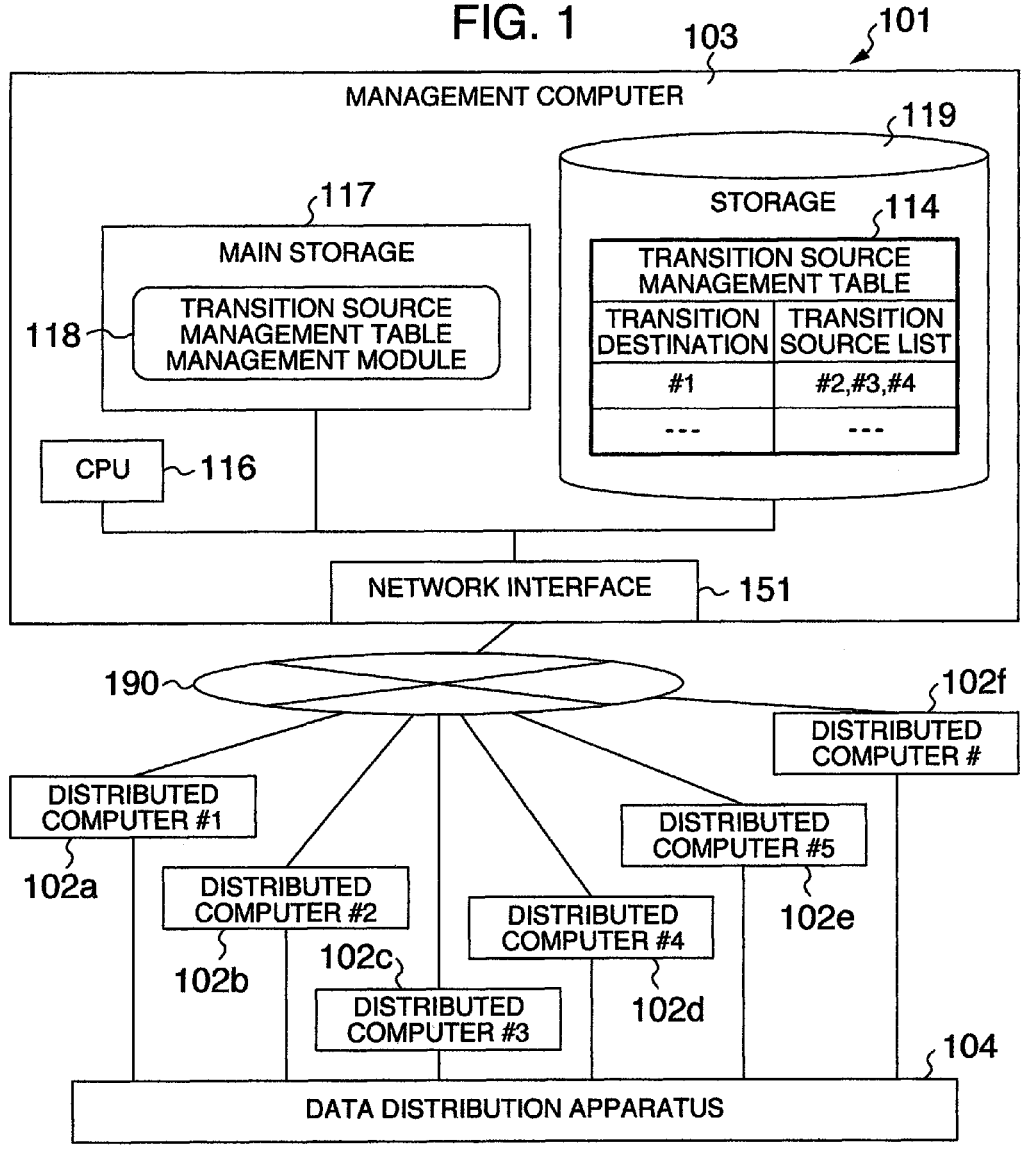
FIG. 1
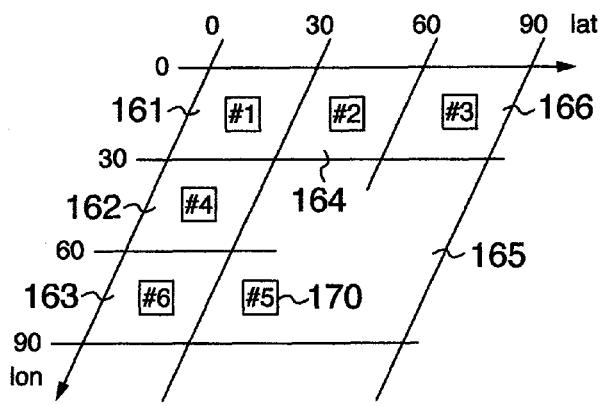

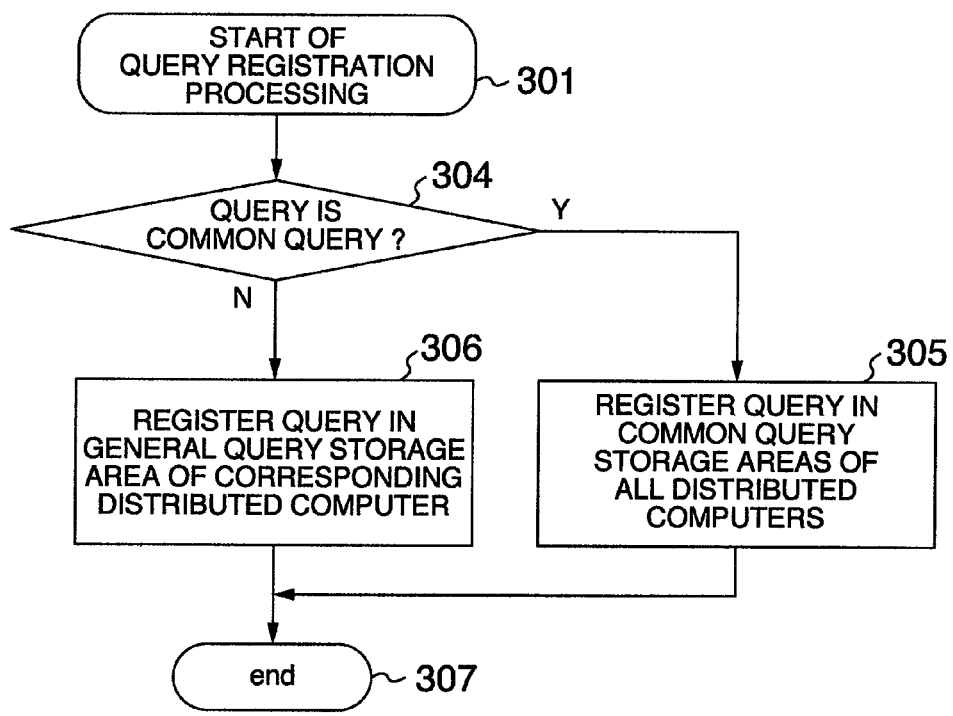
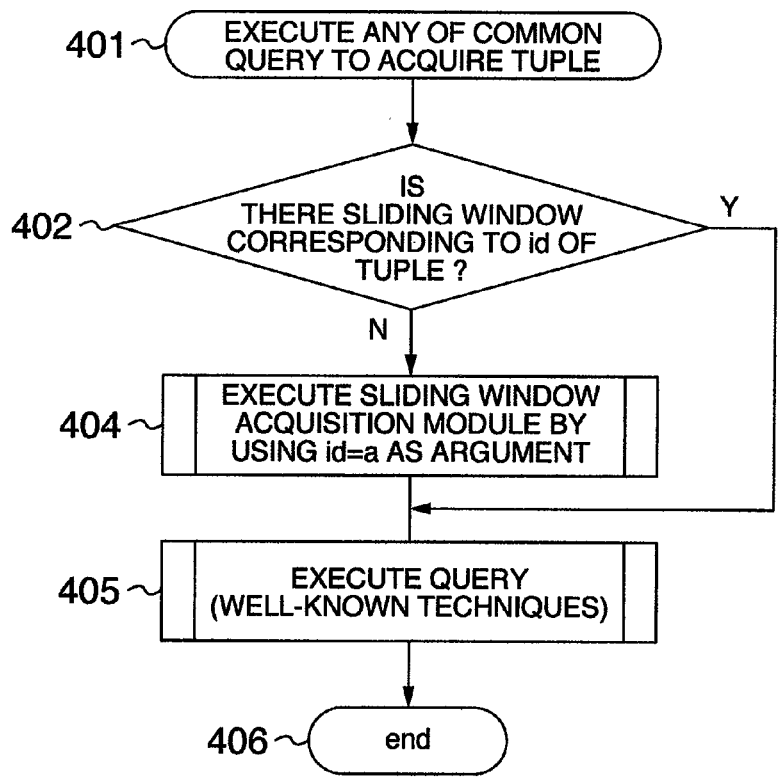

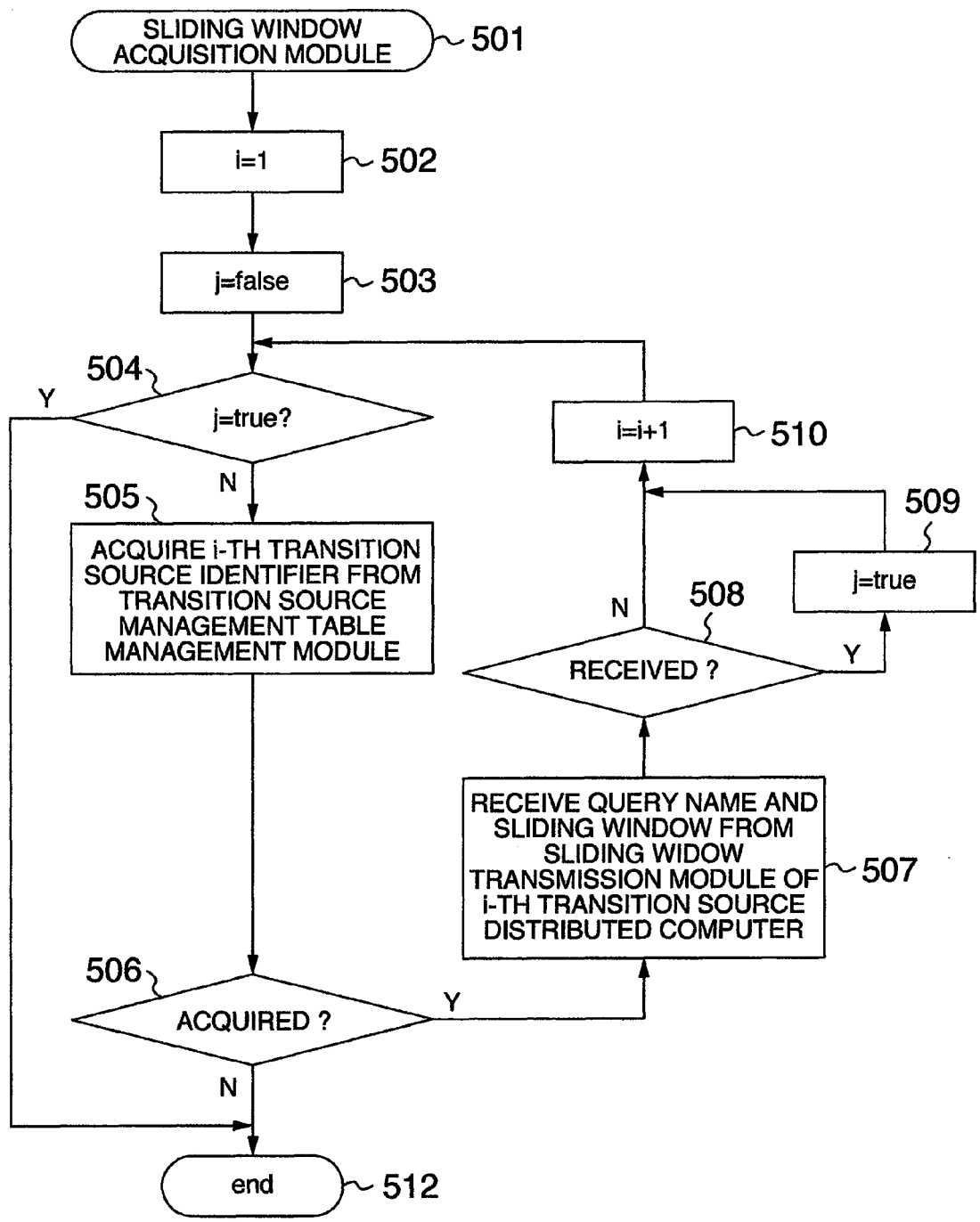

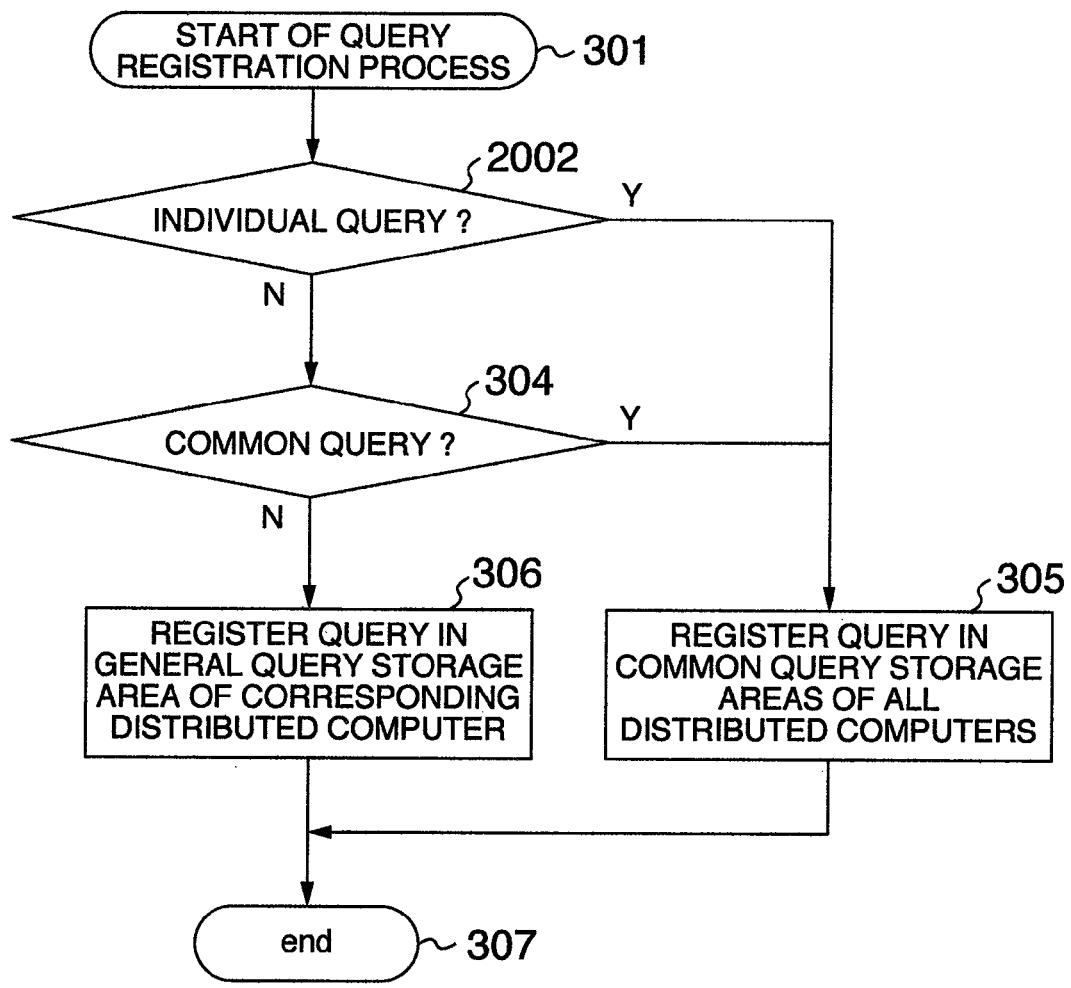

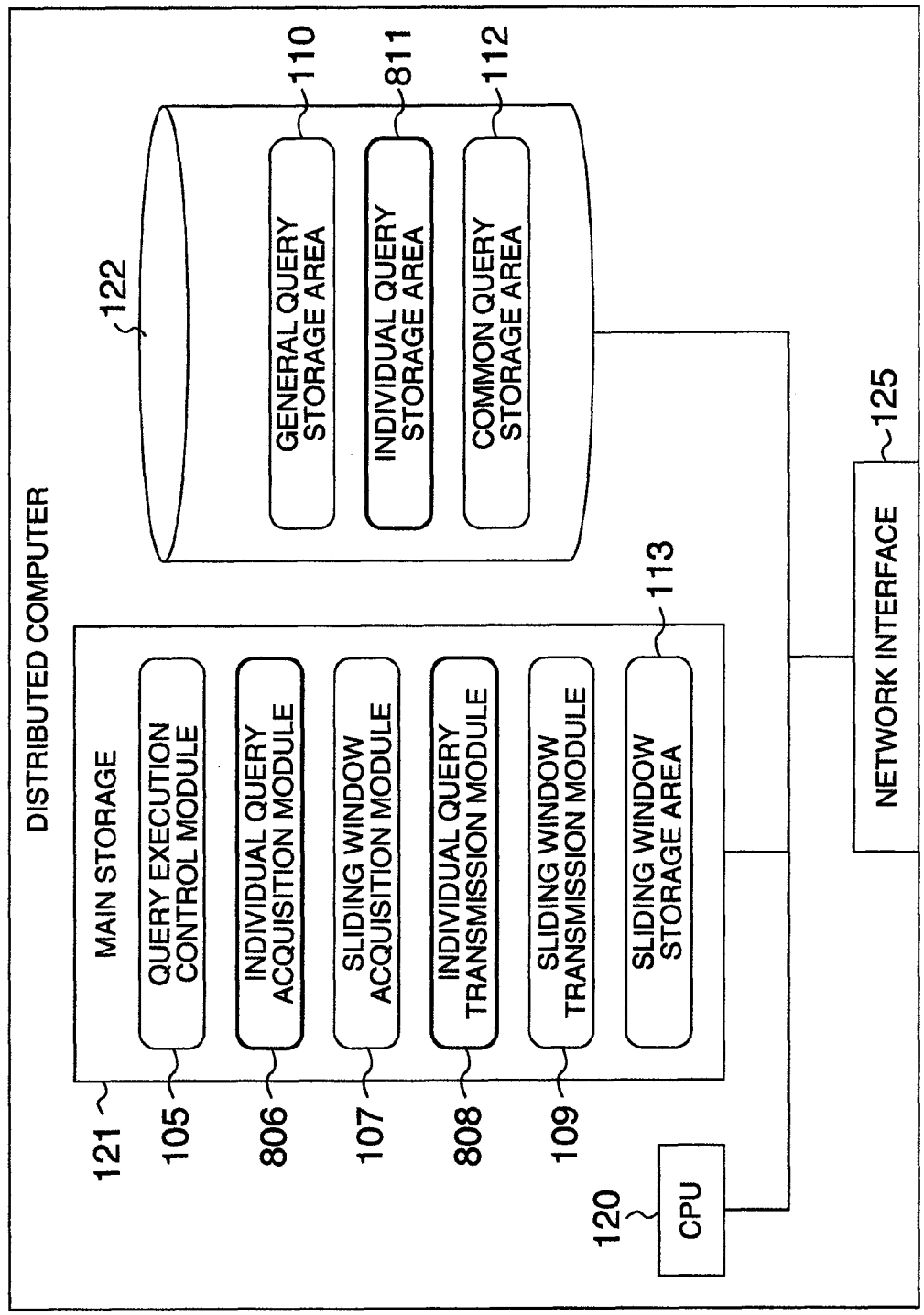

METHOD AND COMPUTING SYSTEM FOR DISTRIBUTED STREAM DATA PROCESSING USING PLURAL OF COMPUTERS

INCORPORATION BY REFERENCE

The present application claims priority from Japanese application JP2009-178561 filed on Jul. 31, 2009, the content of which is hereby incorporated by reference into this application.

BACKGROUND OF THE INVENTION

The present invention relates to an information processing system, and more particularly to stream data processing by distributed processing of a plurality of computers.

Conventional data processing techniques generally utilize relational database (hereinafter abbreviated to RDB) techniques. The problems arising when a large amount of data is processed in a short response time by using RDB are mainly to store data once in a disk drive slower than a main storage and to apply a query to stored data in a batch processing mode. The influence of a response time prolonged by storing data in a disk drive is mitigated because in recent years a cost of a main storage becomes low and techniques of storing data in a main storage are prevailing. However, a response time is prolonged by applying a query in a batch processing mode to RDB.

Stream data processing techniques solve the disadvantages of RDB by registering queries in a system in advance, and when data arrives at the system, processing a query by a differential approach. Further, a query can be written easily by utilizing declarative query definition language called CQL.

The stream data processing techniques provide efficient conversion from stream data to relational data, by using a sliding window. Further, the stream data processing techniques utilize query description language called CQL which is obtained by adding SQL with a conversion operation for stream data and relational data, in order to easily write a process similar to SQL for relational data. Furthermore, the stream data processing techniques perform an aggregate operation by a differential approach in main memory, in order to execute a process for relational data, particularly an aggregate process, at high speed.

These techniques are disclosed in A. Arasu et al, "STREAM: The Stanford Stream Data Manager" IEEE Data Engineering Bulletin, Vol. 26, 2003.

SUMMARY OF THE INVENTION

Since the stream data processing is performed by a differential approach in memory, a processing ability is very high even one distributed computer is used. If a processing ability is insufficient, processing is shared by a plurality of data processing apparatus.

Processing is required to be divided by considering a status because the stream data processing is a process having the status corresponding in amount to a sliding window length.

A computer constituting a stream data processing system processes a firing event inside a query upon a trigger of a time represented by a time-range sliding window. Because of this, implementation of a computer is not perfect event driven processing, and it is required to execute a process such as time management even during a period while data as an event does not arrive at the stream data processing system. At this process stage, irrespective of whether data is present or absent, it is necessary to execute all queries having a time-range sliding window, and all queries receiving outputs of queries having a time-range sliding window. Therefore, as a query having a time-range sliding window is registered in the stream data processing system, irrespective of whether data is present or absent, a CPU resource and in some cases a memory resource are consumed. Consumption of a CPU resource and a memory resource by a query having a time-range sliding window is called herein a busy wait.

In distributively performing the stream data processing by using a plurality of computers, particularly in processing a positional relation between terminals, a dividing key should be used as coordinates. However, in this case, as a terminal moves, an assigned computer is changed and it is necessary for each computer to manage its query and sliding window. A query including a constrained condition of a primary key consumes CPU and memory resources wastefully.

In order to solve at least one of the above-described problems, according to one mode of the present invention, when one of a plurality of computers for executing a query receives a tuple, data necessary for execution of a query and a query itself are acquired from another computer. In another mode, each computer manages an acquisition candidate.

More specifically, a mode may be used in which when a tuple having a new primary key value is detected while a query is executed, a sliding window relevant to the query is inherited between computers. Further, another mode may be used in which another relevant query and a sliding window relevant to this query are inherited between computers. Other modes are clarified in the embodiments to be described later.

According to one mode of the present invention, it is possible to distributively execute a query between different computers.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram illustrating an example of the structure of a position information processing system.

FIG. 3 illustrates a process flow of a query registration process according to a first embodiment.

FIG. 4 illustrates a process flow for a common query of the first embodiment.

FIG. 5 illustrates a process flow of a sliding window acquisition module of the first embodiment.

FIG. 20 illustrates a process flow for a query registration process according to a modification of the second embodiment.

FIG. 21 is a diagram illustrating a transition source management table.

FIG. 23 is a diagram illustrating the structure of a distributed computer 103 of the second embodiment.

DESCRIPTION OF THE EMBODIMENTS

Description will be made on stream data processing using a plurality of distributed computers, by using position information processing by way of example.

In the position information processing, a query containing a condition of "proximity to" occurs frequently. It is therefore desired to distribute the processing to a plurality of distributed computers in such a manner that an amount of communications between distributed computers executing queries becomes small. As this distribution method, a coordinate distribution method is known.

Figure 2:
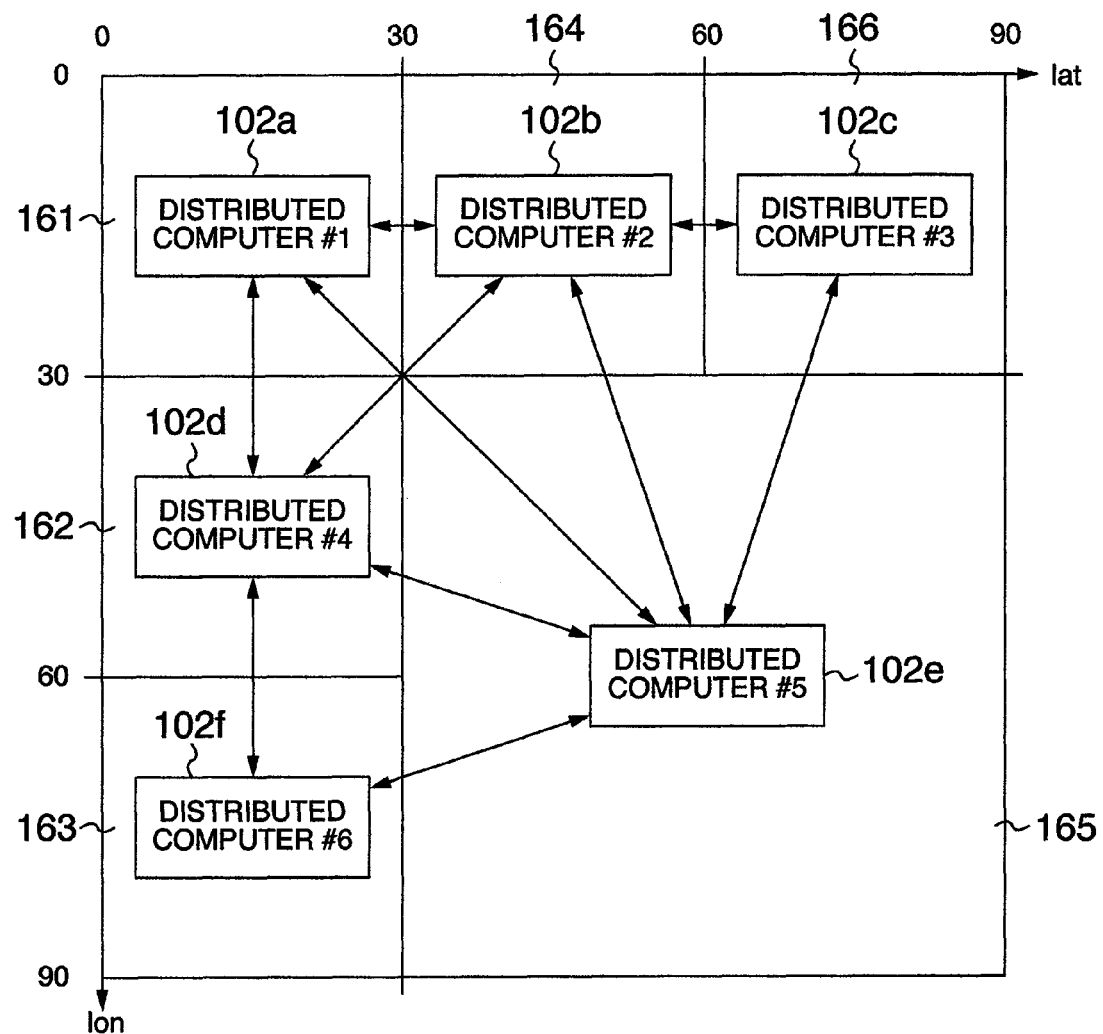
FIG. 2 is a schematic diagram illustrating the relation between area division and server assignment.

FIG. 2 is a schematic diagram illustrating the relation between area division and server assignment. An example of a processing distribution method using coordinates is illustrated in FIG. 2. In this example, a district is divided into six areas 161 to 166, and each area is assigned one of distributed computers 102a to 102f. By distributing the processing in this manner, a query containing a condition of "proximity to" can be processed efficiently. Namely, data generated in an area 161 defined by 0<=lat (latitude)<30 and 0<=lon (longitude) <30 is assigned to a distributed computer #1, data generated in an area 162 defined by 0<=lat<30 and 30<=lon<60 is assigned to a distributed computer #2, data generated in an area 163 defined by 0<=lat<30 and 60<=lon<90 is assigned to a distributed computer #3, data generated in an area 164 defined by 30<=lat<60 and 0<=lon<30 is assigned to a distributed computer #4, data generated in an area 165 defined by 30<=lat<90 and 30<=lon<90 is assigned to a distributed computer #5, and data generated in an area 166 defined by 60<=lat<90 and 0<=lon<30 is assigned to a distributed computer #6. The distributed computers 102a to 102f execute stream data processing for the assigned data.

Specifically, in a system for tracking a mobile device such as a mobile phone with GPS, a query 1 for detecting that a mobile phone having a telephone number of 000-0000-0000 and a mobile phone having a telephone number of 111-1111-1111 are in proximity to each other by 100 m or shorter is assigned to all six distributed computers. It is possible therefore to execute the query without communications between distributed computers.

A query 2 for calculating a movement speed of all mobile phones is assigned to all six distributed computers. It is possible therefore to execute the query without communications between distributed computers. A query 3 for sending a message to a portable phone at a position defined by aaa of a north latitude and bbb of an east longitude is assigned to the distributed computer #5 assigned the position defined by aaa of a north latitude and bbb of an east longitude. It is therefore possible to execute the query without communications between distributed computers.

However, even if the coordinate division method is used, the system for tracking a mobile device is associated with an issue that CPU and main storage resources of the distributed computers are used by an unnecessarily large amount. Specifically, considering again the example of the mobile phone, as the mobile phone having a telephone number of 000-0000-0000 moves, the distributed computer for actually executing a process changes, and if a tuple-based sliding window is used in the query 1 or 2, an unnecessary tuple-based sliding window is left in the distributed computer executed the query in the past. A query regarding a particular terminal such as the query 1 is assigned to all distributed computers. Therefore, a busy wait occurs in the distributed computer assigned to an area where the mobile phone having the telephone number of 000-0000-0000 and the mobile phone having the telephone number of 111-1111-1111 do not exist, and therefore CPU and main storage resources are consumed wastefully.

In the system for tracking a mobile phone, a telephone number is a unique identifiable value, and this value may be reworded as a foreign key in RDB. In this specification, a term "foreign key" is used and the queries 1 to 3 are processed by classifying them into three types: an individual query; a common query; and a general query, respectively.

The individual query is a query having an equal condition or range condition (or having a comparison predicate) regarding the RDB foreign key. Specifically, the individual query is a query such as the query 1 containing the equal condition of telephone numbers.

The common query is a query for performing an aggregate operation for each foreign key value. Specifically, the common query is a query such as the query 2 for performing an aggregate operation for each telephone number, and a "partition by" condition is added to CQL by a foreign key.

The general query is a query belonging neither to the individual query nor to the common query. Specifically, the general query is a query not having a condition or a query such as the query 3 having a condition of coordinates irrelevant to the foreign key.

The first embodiment describes an example of a position information processing system using as a data source a mobile phone periodically sending GPS information as position information, and not using the individual query. Data transmitted from a portable phone has position information including an id (identifier) column for identifying a telephone number, a lon column representative of a longitude of a present position, and a lat column representative of a latitude of a present position. The id column of this embodiment provides a role of the foreign key of RDB.

FIG. 1 illustrates the structure of a position information processing system 101 of the embodiment. The position information processing system 101 is a computer system having a plurality of distributed computers 102, a management computer 103 and a data distribution apparatus 104. The distributed computers 102, management computer 103 and data distribution apparatus 104 are interconnected via a network 190.

The management computer 103 has a CPU 116, a main storage 117, a storage 119 and a network interface 151 which are interconnected by buses. The main storage 117 stores a transition source management table management module 118 as a program. The storage 119 stores a transition source management table 114. CPU 116 executes the transition source management table management module 118 on the main storage 117. CPU 116 stores the transition source management table 114 in the storage 119.

The transition source management table 114 manages assignment of the distributed computers 102a to 102f at which data is processed. The transition source management table 114 manages names of identifiers of distributed computers geographically adjacent to each distributed computer.

FIG. 2 illustrates an example of area division and distributed computer assignment. In this example, an area 201 is divided into six areas, and each area is assigned one of distributed computers #1 (102a) to #6 (102f). A geographical proximity relation of these six distributed computers 102a to 102f is managed by using the transition source management table 114 illustrated in FIGS. 1 and 21.

The data distribution apparatus 104 is connected to the distributed computers 102a to 102f via the network. Data from each of the mobile phones #1 to #6 is distributed to a plurality of distributed computers 102 in accordance with values in the lat and lon columns. In this embodiment as illustrated in FIG. 2, data generated in an area 161 defined by 0<=lat<30 and 0<=lon<30 is assigned to the distributed computer #1, data generated in an area 162 defined by 0<=lat<30 and 30<=lon<60 is assigned to the distributed computer #2, data generated in an area 163 defined by 0<=lat<30 and 60<=lon<90 is assigned to the distributed computer #3, data generated in an area 164 defined by 30<=lat<60 and 0<=lon<30 is assigned to the distributed computer #4, data generated in an area 165 defined by 30<=lat<90 and 30<=lon<90 is assigned to the distributed computer #5, and data generated in an area 166 defined by 60<=lat<90 and 0<=lon<30 is assigned to the distributed computer #6. It is possible to realize a data distribution process easily by utilizing already existing router techniques. If a mobile phone communication system allows a mobile phone base station to perform a process to be executed by a distributed computer, it is considered that the data distribution apparatus becomes unnecessary. The distributed computers 102a to 102f process data distributed from the data distribution apparatus 104 by an operation on the basis of the stream data processing.

Figure 22:
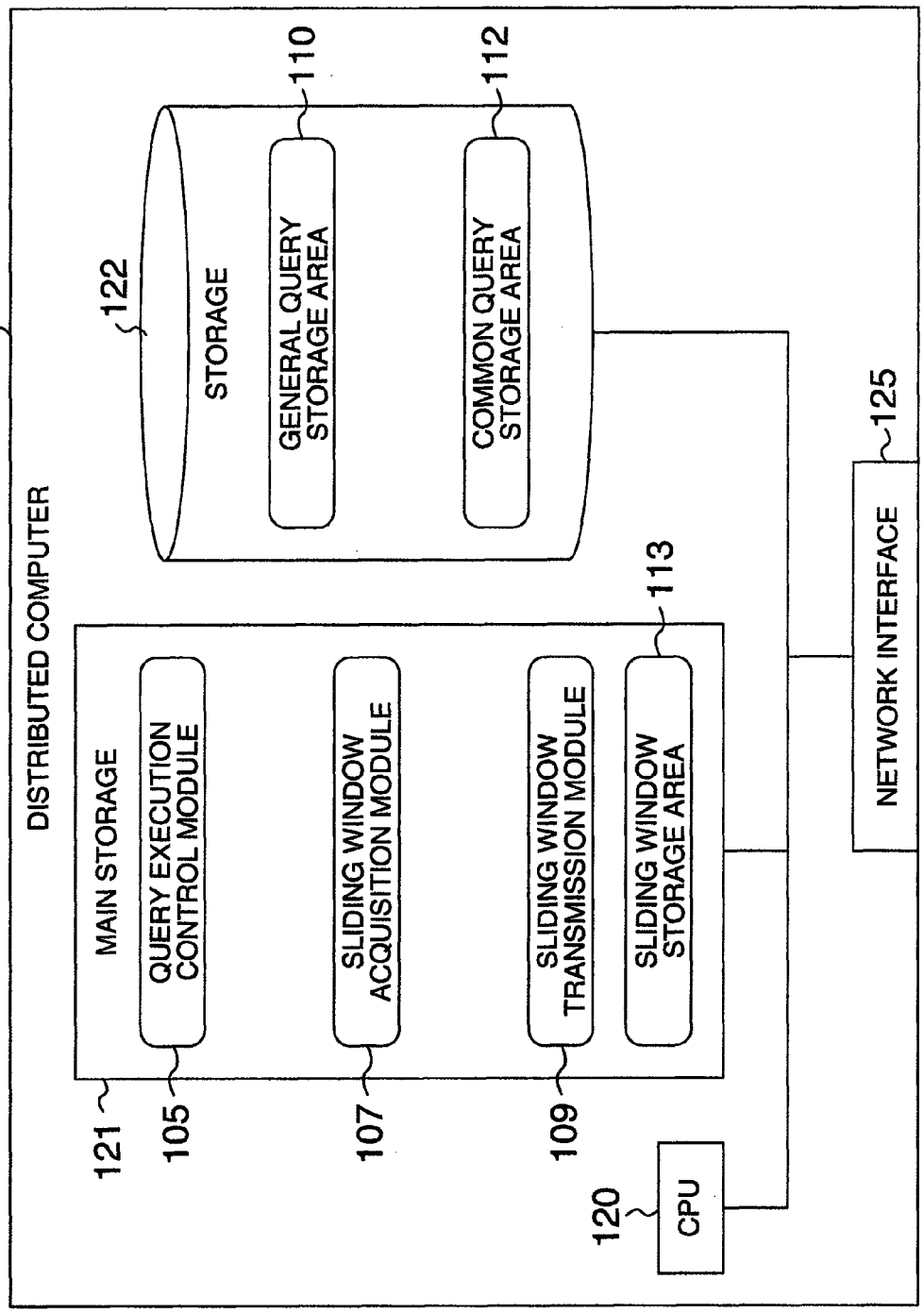
FIG. 22 is a diagram illustrating the structure of a distributed computer 102 of the first embodiment.

FIG. 22 is a diagram illustrating the structure of a distributed computer 102. The distributed computer 102 has a CPU 120, a main storage 121, a storage 122 and a network interface 125 which are interconnected by buses. The distributed computer 102 stores programs including a query execution control module 105, a sliding window acquisition module 107 and a sliding window transmission module 109 in the main storage 121, and has a general query storage area 110 and a common query storage area 112 in the storage 122. CPU 120 is a control unit for executing each program stored in the main storage. CPU 120 stores sliding window data in a sliding window storage area 113 of the main storage 121. CPU 120 stores general queries and common queries in the general query storage area 110 and common query storage area 112, respectively. Each program may be stored in a nonvolatile storage medium such as the storage 122. When CPU 120 executes a program, the program is developed on the main storage 121. The network interface 125 connects the network for transmission/reception of data and control commands to/from the management computer 103 and data distribution apparatus 104.

The query execution control module 105 is a program for receiving data from the data distribution apparatus 104, executing each query stored in the general query storage area 110 and common query storage area 112 and generating execution results. Although the execution results are output to the outside of the position information processing system, the execution results may be transmitted and input to another distributed computer 102 depending upon the processing content. The query execution control module 105 receives a sliding window from another distributed computer 102 or management computer 103 via the sliding window acquisition module 107.

In accordance with an instruction from the query execution control module 105, the sliding window acquisition module 107 communicates with a sliding window transmission module 109 of another distributed computer 102 to receive a sliding window. The sliding window acquisition module 107 stores the received sliding window in the sliding window storage area 113.

The sliding window transmission module 109 has a function of transmitting a sliding window stored in the sliding window storage area 113 to the sliding window acquisition module 107 of another distributed computer 102, in accordance with an instruction from the sliding window acquisition module 107 of the other distributed computer 102.

The general query storage area 110 is a storage area for storing a general query to be executed by the distributed computer 102. The general query is stored as a character string written in CQL generally used by stream data processing techniques. When a query is to be executed, the query execution control module 105 converts a query character string into an executable program.

The common query storage area 112 is a storage area for storing a common query.

The sliding window storage area 113 is a storage area for storing data of a sliding window to be used in a program (query) to be executed by the query execution control module, and is provided, for example, in the main storage (memory). Namely, the sliding window storage area 113 is a storage area for storing data of a sliding window. For example, data of a sliding window is a data tuple received from an external, an aggregate tuple or secondary tuple generated upon execution of a query, or a control tuple. A tuple held in a sliding window is reused when a query is executed.

FIG. 21 illustrates a transition source management table 114. The transition source management table 114 is a table constituted of two columns: a transition destination identifier 209 and a transition source identifier list 210. In this embodiment, although it is assumed that the transition source management table is given by a user as initial settings during system configuration, a module for managing the transition source management table may be additionally used to facilitate support for a dynamic configuration change of the distributed computer and data distribution apparatus.

Next, description will be made on an operation example of the position information processing system 101.

FIG. 3 illustrates a process flow when the position information processing system 101 registers a query. A query externally input is received by the management computer 103. After the start of the query registration process (301), CPU 116 judges first whether the received query is a common query (304). If it is a common query, CPU 116 registers the common query in the common query storage areas 112 of all distributed computers 102 via the network (305). If it is not a common query, it is a general query to be executed by a single distributed computer 102 or a plurality of distributed computers. CPU 116 registers the general query in the general query storage area or areas 110 of corresponding one or more distributed computers 102 via the network (306). After the registration processes (305) and (306) are completed, the query registration process is terminated (307).

Next, description will be made on a process flow of each distributed computer 102 when data is received from a mobile phone. As described earlier, when data is received, the distributed computer 102 stores the data once in a queue, and at the timing when the query execution control module 105 executes the query, pulls the data necessary for the query from the queue.

FIG. 4 illustrates a process flow for a common query. The common query process flow starts when the query execution control module 105 refers to the common query storage area 112 and executes each stored query. The query execution control module 105 starts the common query process flow to acquire data from a proper queue (401). It is assumed that a value of the id column of the acquired data is "000-0000-0000". Next, the query execution control module 105 judges whether there is a sliding window corresponding to the id column of the data (402). If a sliding window exists already, the query execution control module 105 executes the query (405) and terminates the process (406). The query execution process (405) is similar to that of conventional techniques. If the result of the judgment (402) indicates that a sliding window corresponding to the id column of the data does not exist, the query execution control module 105 executes the sliding window acquisition module by using a column name and a value, i.e., "id, 000-0000-0000" as an argument (404). The details of the process flow of the sliding window acquisition module 107 will be later described with reference to FIG. 5. Thereafter, by using the acquired sliding window, the query is executed (405) to thereafter terminate the process flow (406).

The case that the judgment step (402) of the common query process flow judges that there is no sliding window is, for example, a case in which a mobile phone moves from a coverage (area) of another distributed computer to its own coverage. Exceptional cases may be a case in which a mobile phone moves from a poor radio wave area such as an area in a tunnel to a good radio wave area, and a case in which a turned-off power source of a mobile phone is turned on. These cases may be dealt with as one kind of the case in which a mobile phone moves to its own coverage. Namely, movement of a sliding window is executed upon an event of movement of a mobile phone.

FIG. 5 illustrates a process flow of the sliding window acquisition module 7. After the process starts by using the column name and value as an argument (501), the sliding window acquisition module 107 substitutes "1" into a variable i used as a counter for a loop process (502), and then substitutes "false" into a variable j for judging whether the acquisition process was able to acquire a sliding window (503). Thereafter, the sliding window acquisition module 107 judges whether j is true (504), and if true, the process is terminated (512).

If j is not true, the sliding window acquisition module 107 acquires from the management computer 103 an i-th transition source identifier written in the transition source management table 114 (505). If the variable i takes a sufficiently large value or if the result of the acquisition step (505) indicates that the i-th transition source identifier is not acquired, then the sliding window acquisition module 107 judges whether the i-th transition source identifier was able to be acquired (506). If acquired, the sliding window acquisition module 107 transmits the column name and value ("id, 000-0000-0000") to the sliding window transmission module of the i-th transition source distributed computer.

The sliding window acquisition module 107 receives a list of a set of a query name and a sliding window content (507). The sliding window acquisition module 107 judges from the result of the reception step (507) whether the query name and sliding window content were able to be received (508), and if received, the sliding window acquisition module 107 substitutes true in j (509).

Thereafter, the sliding window acquisition module 107 increments the counter variable i (510) to thereafter return to the judgment step (504). If the result of the judgment step (504) indicates that the i-th transition source identifier was unable to be acquired, there is a possibility that the mobile phone corresponding to the column name and value is transferred from a geographically discontinuous area, for example, the mobile phone is transferred by turning off its power source. In this embodiment, this case abandons acquisition of a sliding window to thereafter terminate the process (512). After acquisition, the sliding window acquisition module 107 creates one or plural sliding window(s) for the object for execution regarding said query by using the list of the received sliding window and the received query name.

Figure 6:
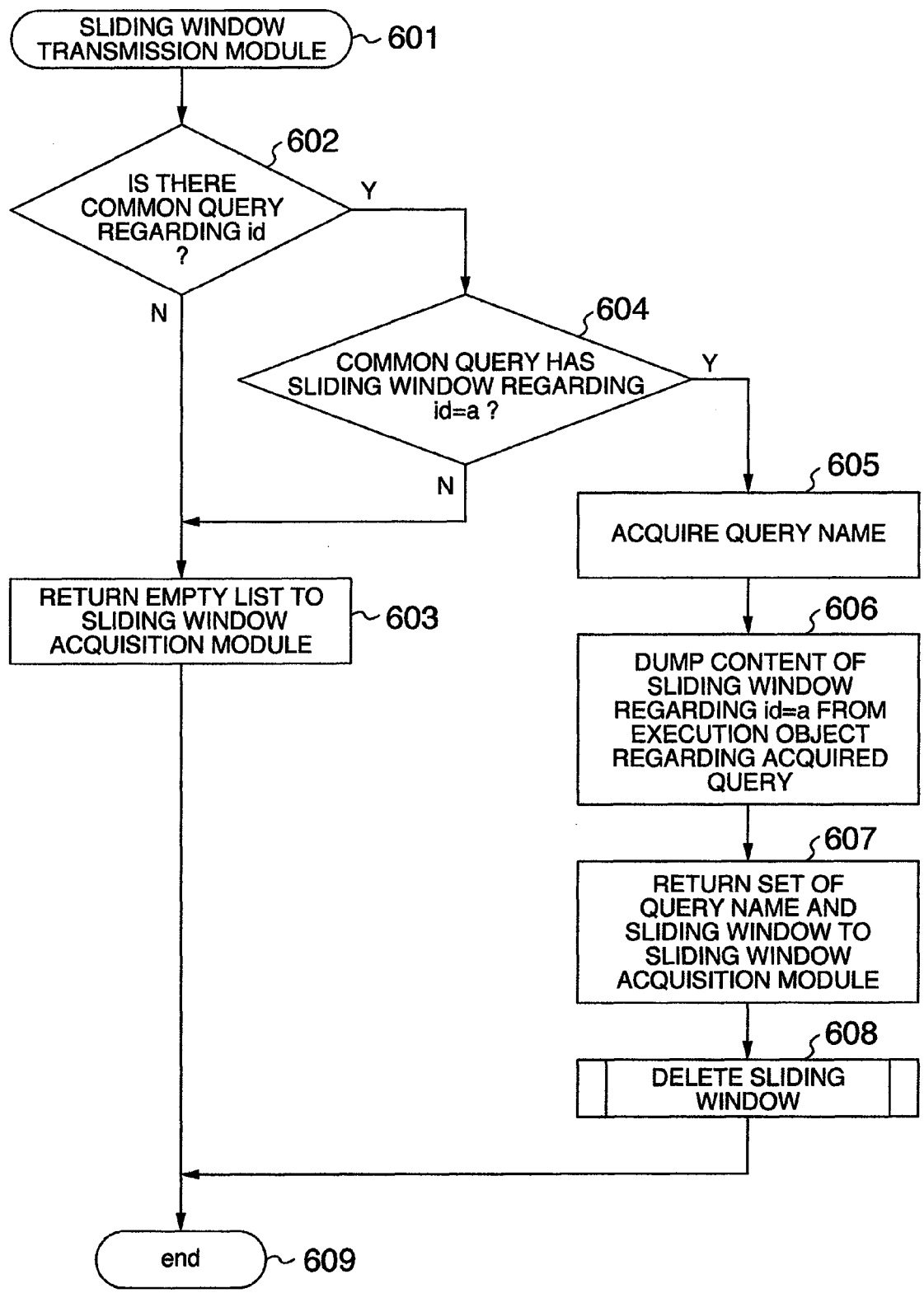
FIG. 6 illustrates a process flow of a sliding window transmission module.

FIG. 6 illustrates a process flow of the sliding window transmission module 109. The sliding window transmission module 109 starts the process by using as an argument the column name and value ("id, 000-0000-0000") (601), and thereafter judges whether a query relevant to the column name exists in the common query storage area 112 (602). For example, a query containing "partition by id" is a relevant query. If the result of the judgment step (602) indicates that there is no relevant query, the sliding window transmission module 109 returns an empty list (603) to thereafter terminate the process (609).

If the result of the judgment step (602) indicates that there is a relevant query, the sliding window transmission module 109 judges whether the query has a sliding window relevant to the list name and value. If it is judged that there is no relevant sliding window, the sliding window transmission module 109 returns an empty list (603).

If the result of the judgment step (604) indicates that there is a relevant sliding window, the sliding window transmission module 109 acquires the name of the query (605), and dumps a sliding window of an object for execution of the query (606). A set of the query name and the sliding window dump is returned to the individual query acquisition module (607), and the sliding window is deleted (608) to thereafter terminate the process (609). The details of the processing of the sliding window deletion (607) will be later described.

Figure 7:
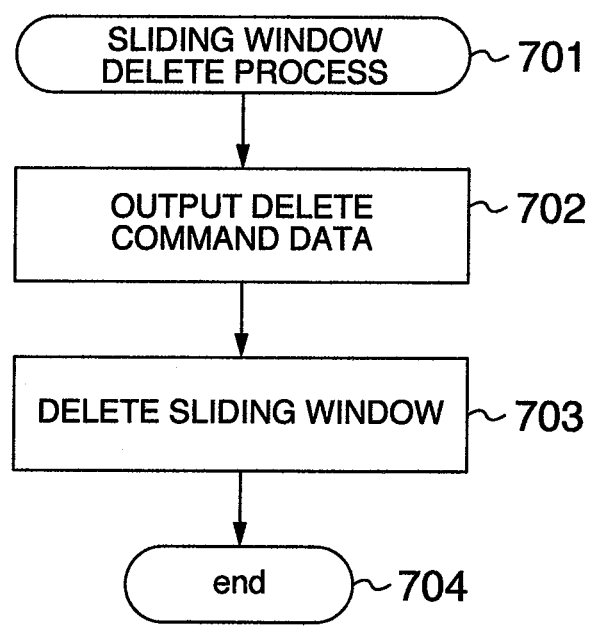
FIG. 7 illustrates a process flow of a sliding window delete process.

The sliding window delete process is illustrated in FIG. 7. After the sliding window delete process starts (701), delete command data is output as an output of the common query (702), thereafter the sliding window is deleted (703) and the process is terminated (704).

With the above-described embodiment, it becomes possible to distributively execute the stream processing of data received from a data source terminal via the network.

<Second Embodiment>

The second embodiment describes an example of a position information processing system capable of using an individual query, by using as a data source a mobile phone transmitting GPS information periodically. Data transmitted from a mobile phone is constituted of an id column representative of a mobile phone number, and a lon column and a lat column representative of a longitude and a latitude of a present location. The id column of this embodiment provides a role of a foreign key of RDB.

Figure 8:
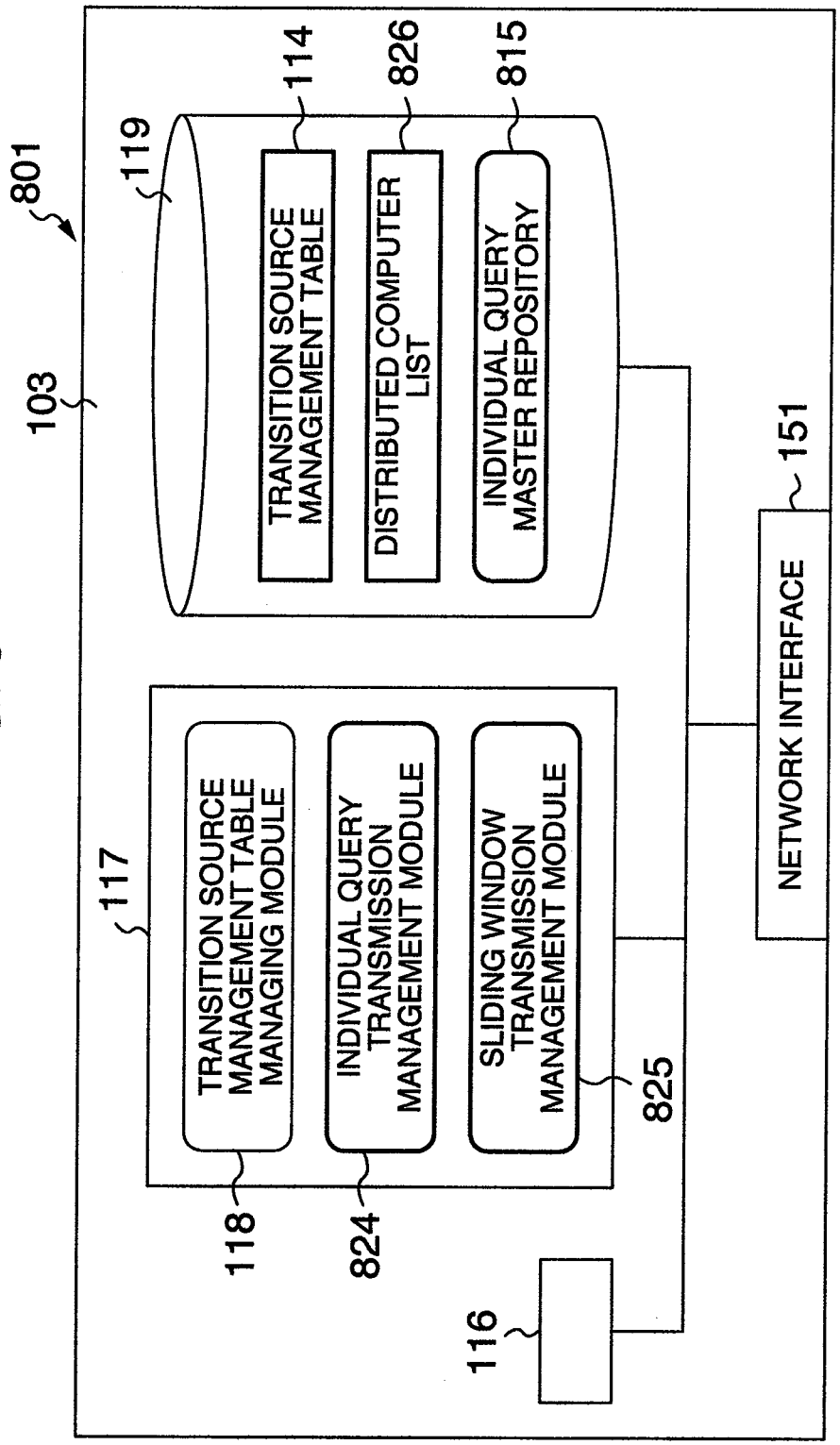
FIG. 8 is a diagram illustrating an example of the structure of a management computer 103 according to a second embodiment.

FIG. 8 illustrates an example of the structure of the management computer 103. The main storage 117 of the management computer 103 stores an individual query transmission management module 824 and a sliding window transmission management module 825. The storage 119 stores a distributed computer list 826, an individual query master repository 815 and a transition source management table 114.

The distributed computer list 826 describes a list of distributed computers which are management targets of the management computer 103. In this embodiment, although it is assumed that the distributed computer list is given by a user as initial settings during system configuration, a module for managing the distributed computer list may be additionally used to support for a dynamic configuration change of the distributed computer.

The individual query master repository 815 is a repository for storing a query not executed by any distributed computer 102, among individual queries registered in the information processing system 801.

FIG. 23 illustrates an example of the structure of a distributed computer 102 of the second embodiment. In addition to the structure of the distributed computer 102 of the first embodiment illustrated in FIG. 22, the main storage 121 stores further an individual query transmission module 808 and an individual query acquisition module 806 for handling an individual query, CPU 120 executing these modules. The individual query transmission module 808 and individual query acquisition module 806 are stored as programs in the storage 122, and when CPU 120 executes these programs, the programs are developed on the main storage 121. An individual query storage area 811 is provided in the storage 122.

Description will now be made mainly on the individual query acquisition module 806, individual query transmission module 808, individual query storage area 811 and individual query master repository 815 respectively added in this embodiment to handle an individual query.

The individual query acquisition module 806 is a program for communicating with the individual query transmission module 808 of another distributed computer 102 to receive a query, and storing the received query in the query storage area 811, in response to an instruction from the query execution control module 105.

The individual query transmission module 808 is a program for transmitting a query stored in the query storage area 811 to the individual query acquisition module 806 of another distributed computer 102, in response to an instruction from the individual query acquisition module 806 of the other distributed computer 102.

The individual query storage area 811 is a storage area for storing an individual query to be executed by the distributed computer 102. The query is stored as a character string written in CQL generally used by stream data processing techniques. When a query is to be executed, the query execution control module 105 converts a query character string into an executable program.

Figure 9:
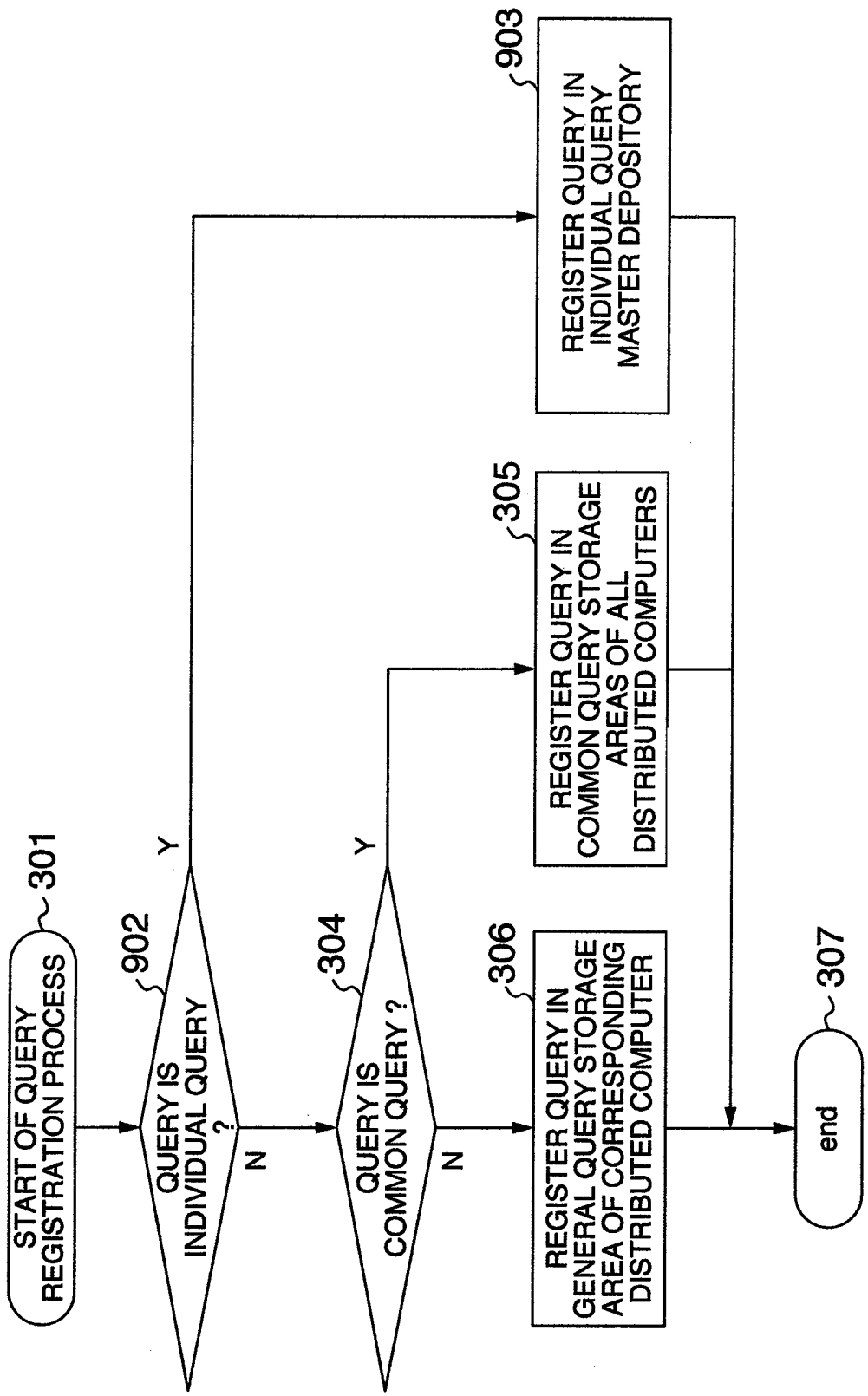
FIG. 9 illustrates a process flow of a query registration module of the second embodiment.

FIG. 9 is a flow chart illustrating query registration for the information processing system 801. In this embodiment, after the query registration process starts (301), CPU 116 judges first whether a query is an individual query (902). If the result of the judgment step (902) indicates that a query is an individual query, CPU 116 stores the individual query in the individual query master repository 815 (903). CPU 116 registers a query definition statement of the query in the individual query master repository 815.

Next, description will be made on a process flow to be executed when data from a mobile phone is received at each distributed computer 102.

Figure 10:
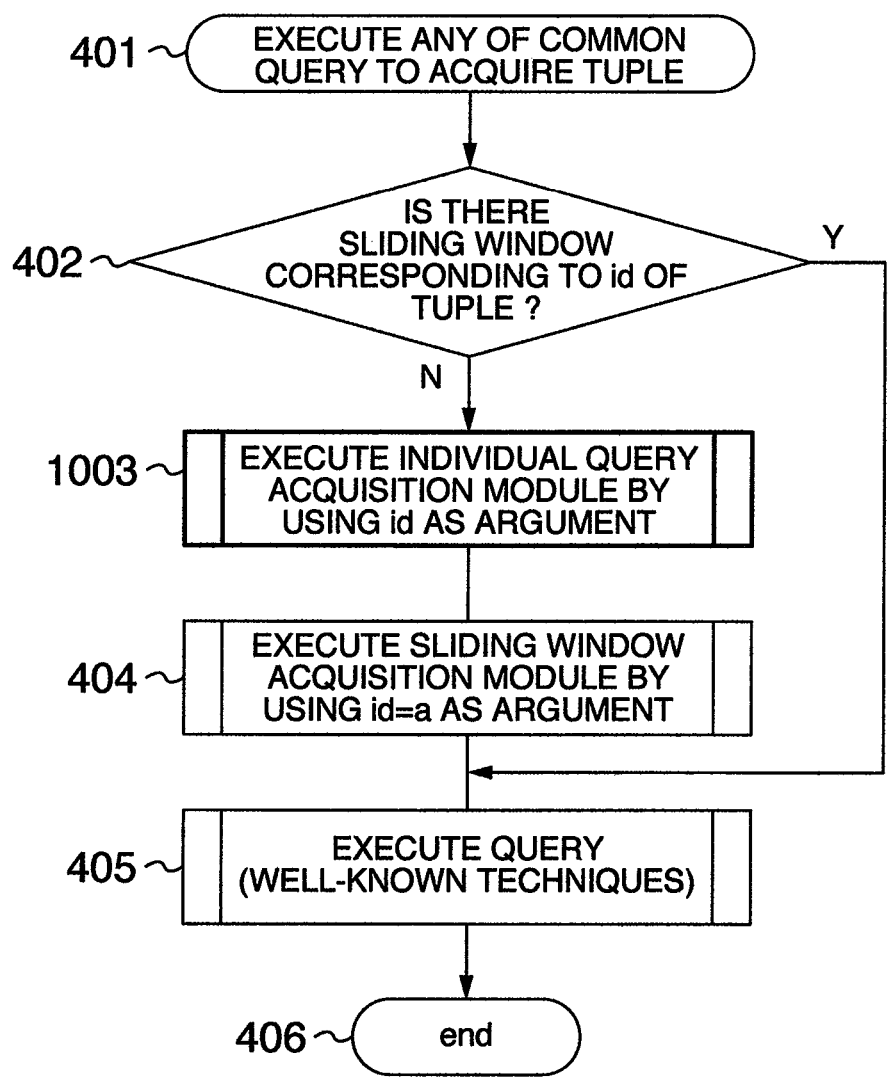
FIG. 10 illustrates a process flow for a common query of the second embodiment.

FIG. 10 illustrates a process flow for a common query. Processes at steps (401) and (402) are similar to those illustrated in FIG. 4. If the judgment result at step (402) indicates that there is a sliding window corresponding to uid of the received tuple, then the query execution control module 105 executes the individual query acquisition module by using uid=a, i.e., a column name and a value, as an argument (1003), prior to executing the sliding window acquisition module (404).

Figure 11:
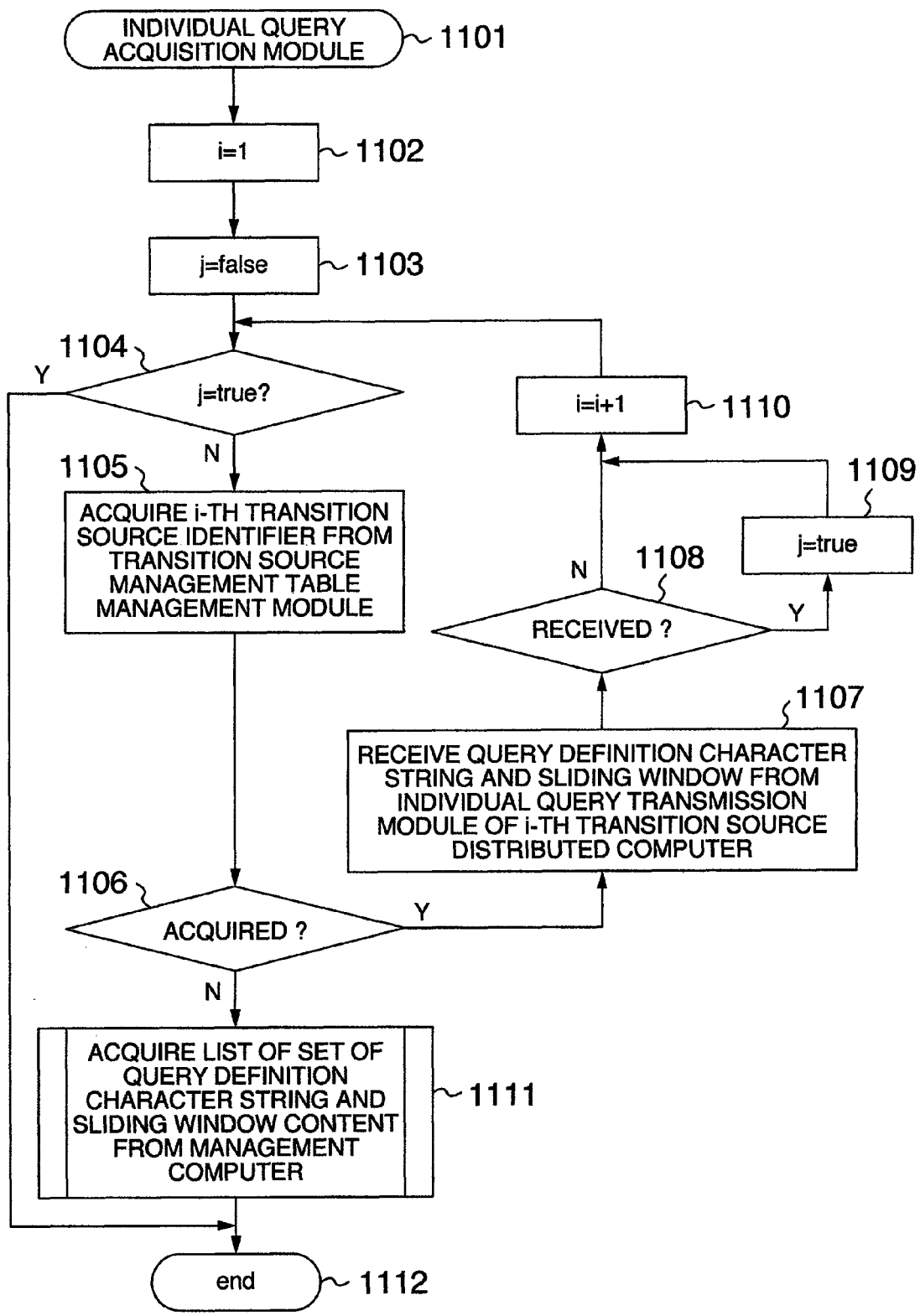
FIG. 11 illustrates a process flow of an individual query acquisition module.

FIG. 11 illustrates a process flow of the individual query acquisition module 806, corresponding to a process at step (1003) illustrated in FIG. 10. After the process starts at (1101) by using the column name and value as an argument, the individual query acquisition module 806 substitutes "1" into a variable used as a counter for a loop process (1102), and then substitutes "false" into a variable j for judging whether the acquisition process was able to acquire a query (1103). Thereafter, it is judged whether j is true (1104), and if true, the process is terminated (1112).

If j is not true, the individual query acquisition module 806 issues a transition source identifier request to the management computer 103 to acquire from the management computer 103 an i-th transition source identifier written in the transition source management table 114 (1105).

If the variable i takes a sufficiently large value, the i-th transition source identifier may not be acquired at the acquisition step (1105). It is therefore judged whether the i-th transition source identifier was able to be acquired (1106). If acquired, the individual query acquisition module 806 passes the column name and value ("id, 000-0000-0000") to the individual query transmission module of the i-th transition source computer to receive a list of a set of a query definition character string and a sliding window content (1107).

The individual query acquisition module 806 judges at step (1108) whether the query definition character string and sliding window content were able to be received as the result of the reception step (1107). If the judgment result indicates that it was able to receive, the individual query acquisition module 806 substitutes true in j (1109), increments the counter variable i (1110), and returns to the judgment step (1104).

If the result of the judgment step (1106) indicates that the i-th transition source identifier was unable to be acquired, there is a possibility that the mobile phone corresponding to the column name and value is transferred from a geographically discontinuous area, for example, the mobile phone is transferred by turning off its power source, or a possibility that the query is just registered in the information processing system 801 and is still in the individual query master repository 815. In this case of the acquisition process of the embodiment, the column name and value are passed to the management computer 103 to receive a list of a set of the query definition character string and sliding window content (1111). The details of the process on the management computer side will be described later. Thereafter, the process is terminated (1112).

Figure 12:
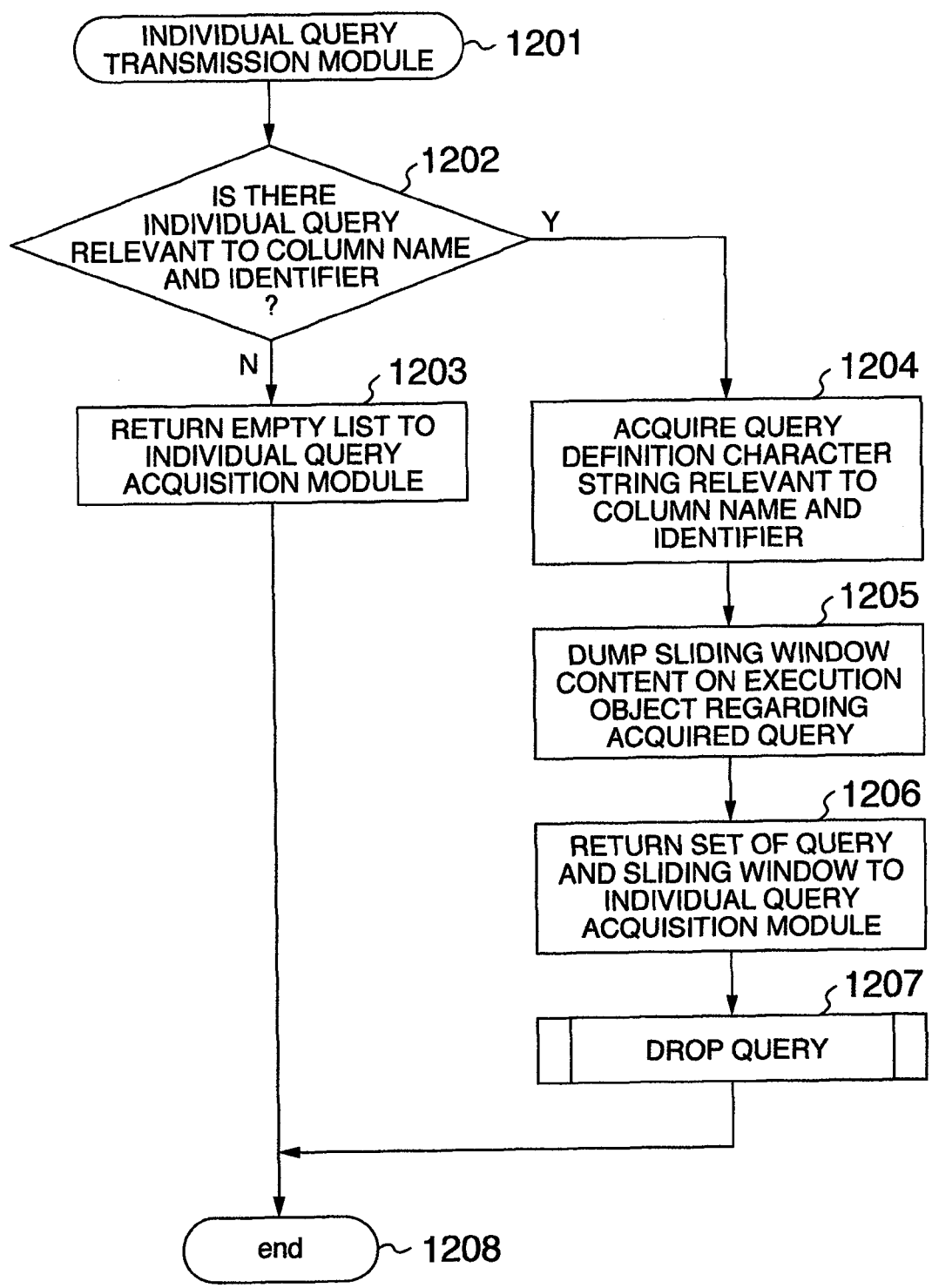
FIG. 12 illustrates a process flow of an individual query transmission module.

FIG. 12 is a process flow of the individual query transmission module 808 on the side of the management computer 103, corresponding to FIG. 11. After the process starts by using the column name and value ("id, 000-0000-0000") as an argument (1201), the individual query transmission module 808 judges whether there is a query relevant to the column name and value in the individual query storage area 111 (1202). For example, in this embodiment, a query containing "where id="000-0000-0000"" is a relevant query. If the id column is data of an integer type, a query relevant to "id, 100" is a query containing "where id >10" or "where id <1000".

If the result of the judgment step 1202 indicates that there is no relevant query, the individual query transmission module 808 returns an empty list (1203) to thereafter terminate the process (1208). If there is a relevant query, the query definition character string of this query is acquired (1204), and a sliding window as an object of query execution is dumped (1205). The individual query transmission module 808 returns a set of the individual query definition character string and the sliding window dump to the individual query acquisition module (1206) to drop the query (1207) and terminate the process (1208). The details of a query drop process will be later described with reference to FIG. 16.

Figure 13:
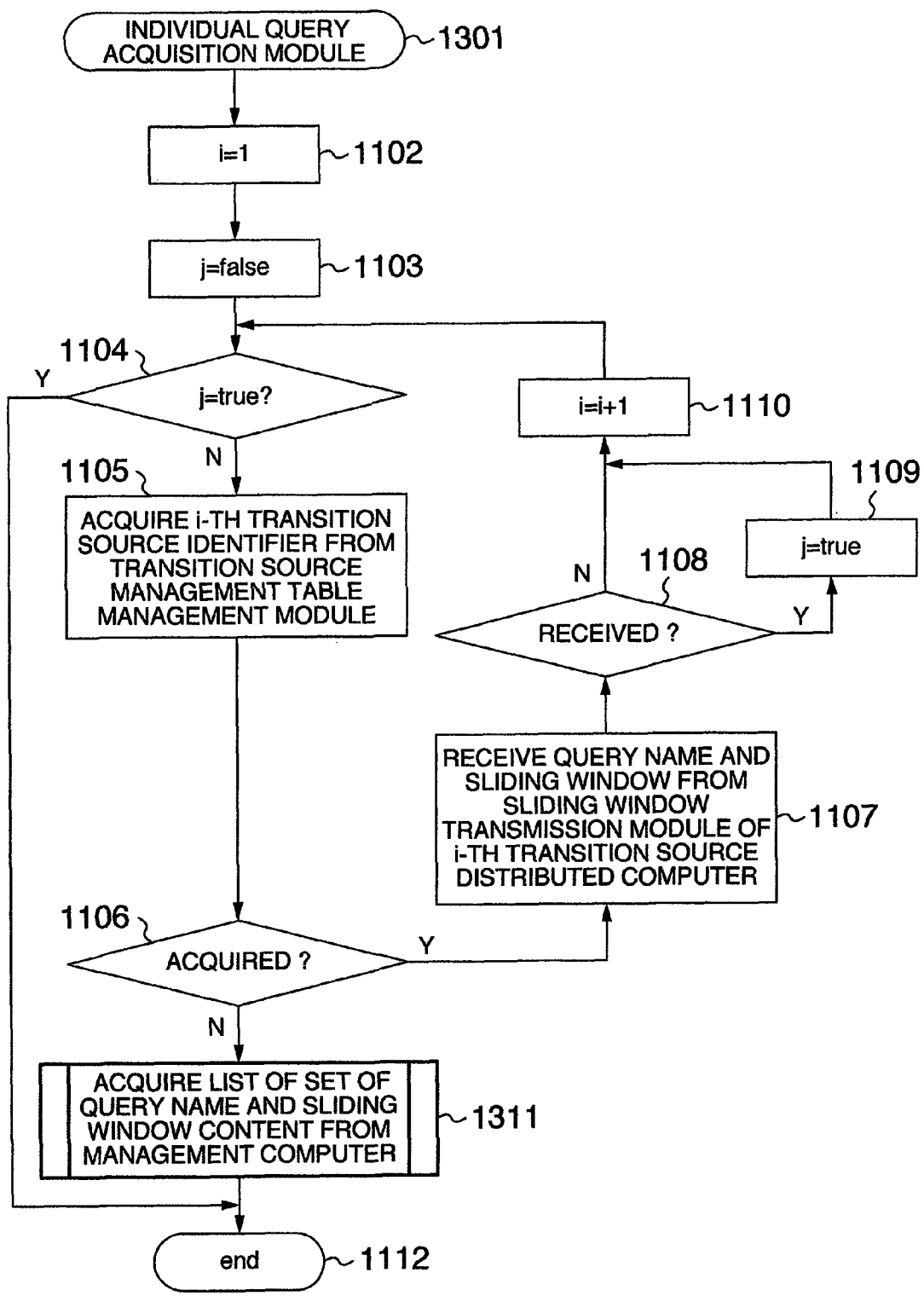
FIG. 13 illustrates a process flow of a sliding window acquisition module of the second embodiment.

FIG. 13 illustrates a process flow 1301 of the sliding window acquisition module 107 of the second embodiment. In this embodiment, if a judgment step 1106 illustrated in FIG. 11 is negated, i.e., if the transition source identifier is received neither from any transmission source distribution computer 102 nor from the sliding window transmission module, the sliding window acquisition module passes the column name and value to the management computer 103 to receive a list of a set of the query definition character string and sliding window content (1311), similar to the process flow (FIG. 11) of the individual query acquisition module. The operation of the sliding window transmission module is similar to that of the first embodiment illustrated in FIG. 6.

Figure 14:
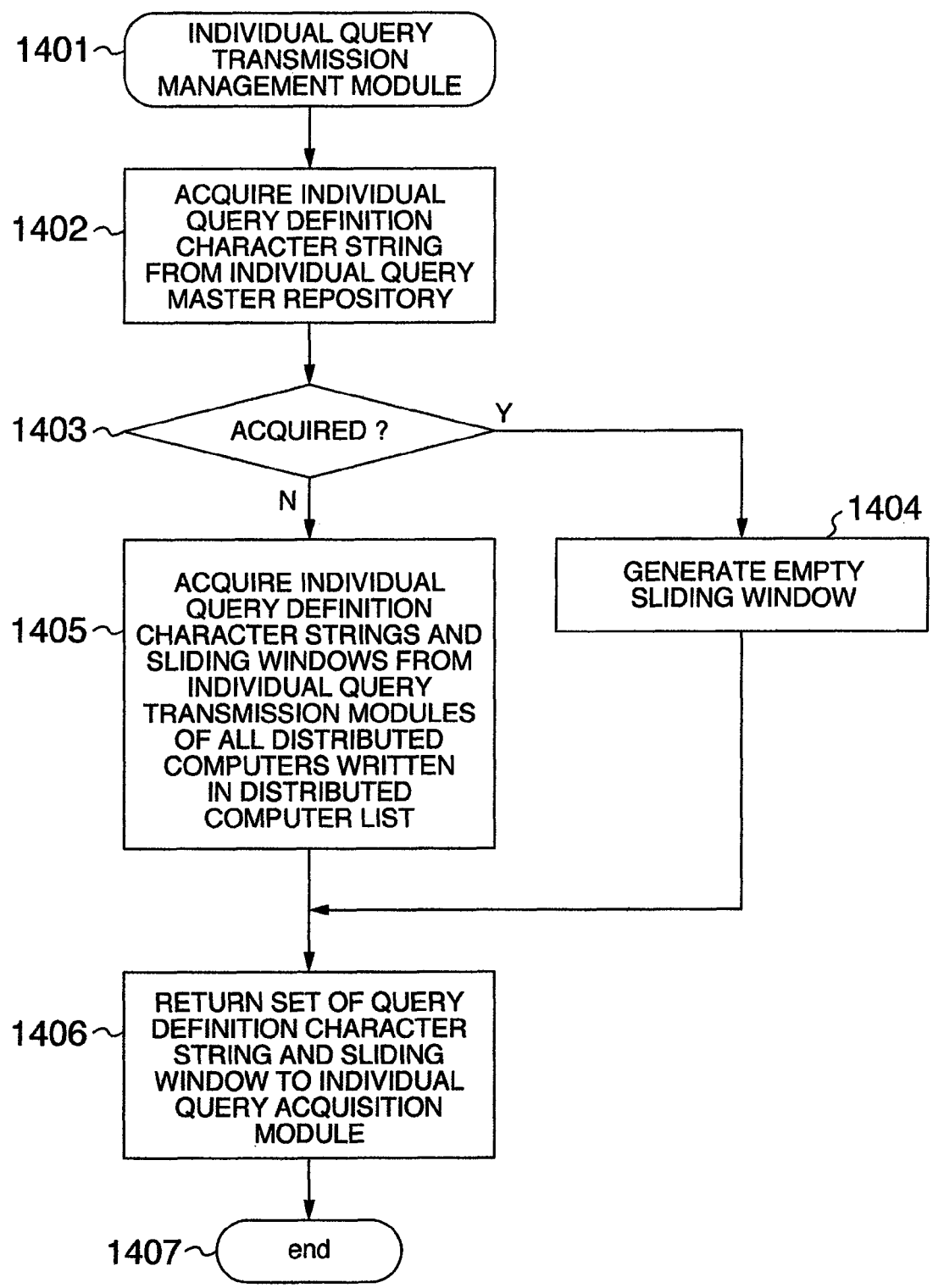
FIG. 14 illustrates a process flow of an individual query transmission management module.

FIG. 14 illustrates a process flow of the individual query transmission management module 824. If an individual query is not acquired from the distributed computer written in the transition source management table 114, the individual query transmission management module 824 is called from the individual query acquisition module 806. After the process starts (1401), the individual query transmission management module 824 acquires an individual query definition character string from the individual query master repository 815 (1402), and judges whether the individual query definition character string was able to be acquired (1403). If the judgment results indicate acquisition, the individual query transmission management module 824 generates an empty sliding window (1404), and transmits a set of the query definition character string and sliding window to the individual query acquisition module (1406) to thereafter terminate the process (1407). If the individual query definition character string was not acquired, the individual query definition character strings and sliding windows are acquired from the individual query transmission modules of all computers written in the distributed computer list (1405), and a set of query definition character strings and sliding windows is transmitted to the individual query acquisition module 806 (1406) to thereafter terminate the process (1407).

Figure 15:
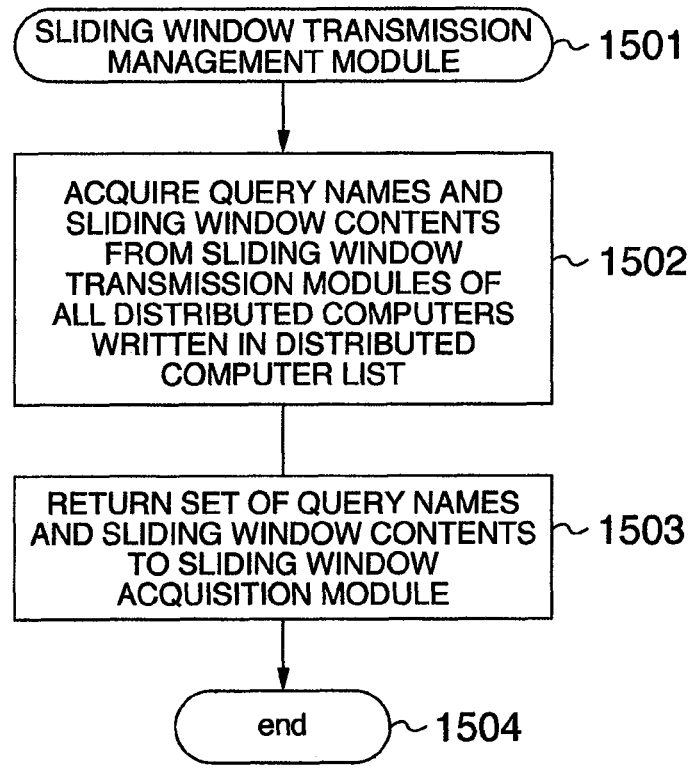
FIG. 15 illustrates a process flow of a sliding window transmission management module.

FIG. 15 illustrates a process flow of the sliding window transmission management module 825. This process is called from the sliding window acquisition module 107 if a sliding window is unable to be acquired from the distributed computer 102 written in the transition management table (1501). After the process starts (1501), the sliding window transmission management module 825 acquires query names and sliding window contents from the sliding window transmission modules of all distributed computers written in the distributed computer list (1502), and transmits a set of query names and sliding window contents to the sliding window acquisition module (1503) to thereafter terminate the process (1504).

Figure 16:
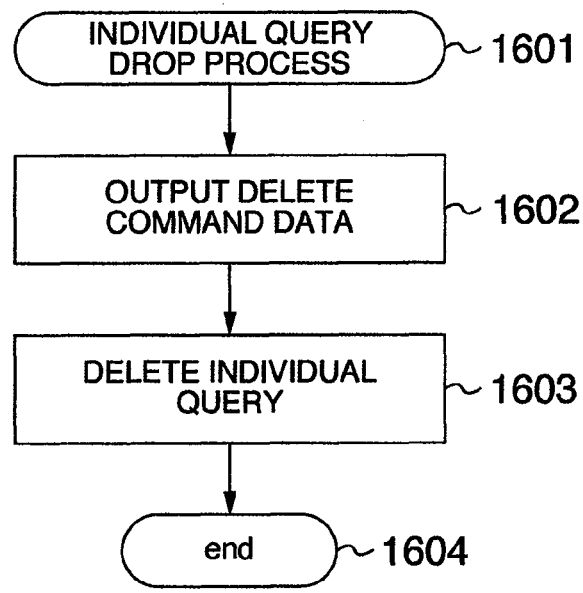
FIG. 16 illustrates a process flow for an individual query drop process.

FIG. 16 illustrates the details of the step (1207) in FIG. 12, i.e., the drop process for an individual query. After the start of a drop preparatory process for an individual query (1601), the individual query transmission module 808 outputs delete command data as an output of the query (1602), and then deletes the individual query (1603) to thereafter terminate the process (1604). The delete command data is special management data, and contains a combination of a column name and a value ("id, 000-0000-0000") in order to discriminate data in a sliding window to be deleted. An operation of distributed computers received delete command data will be described later with reference to FIG. 18.

Figure 17:
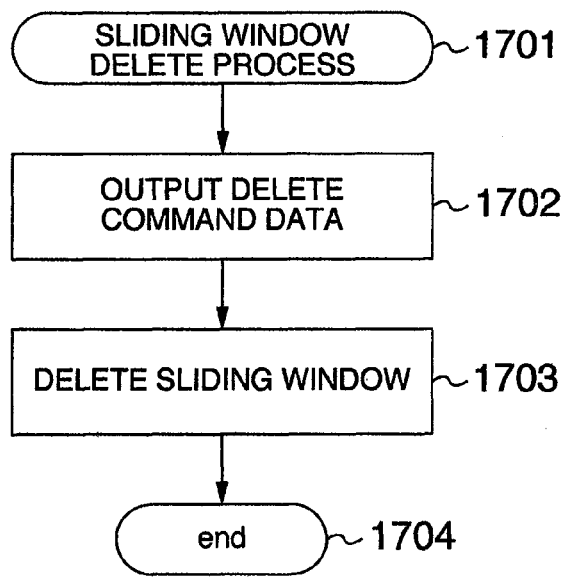
FIG. 17 illustrates a process flow for a sliding window delete process.

FIG. 17 illustrates a sliding window delete process. After the start of a sliding window delete process (1701), delete command data is output as the common query (1702), and the sliding window is deleted (1703) to thereafter terminate the process (1704).

Figure 18:
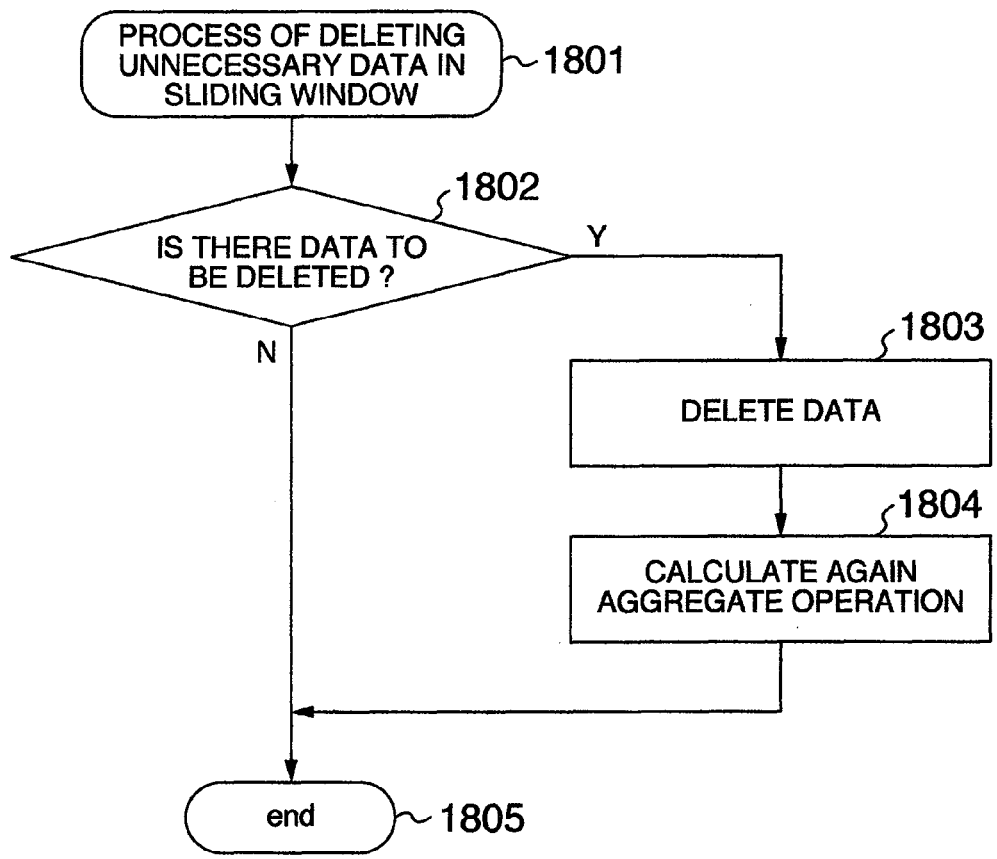
FIG. 18 is a flow chart illustrating an operation to be executed when delete command data is received.

FIG. 18 is a process flow to be executed by distributed computers when delete command data is received. Upon reception of delete command data, the distributed computer 102 executes a delete process (1801) of deleting unnecessary data in all sliding windows in a query corresponding to the delete command data. After the start of the delete process (1801) of deleting unnecessary data in sliding windows, it is judged by referring to a combination of a column name and a value contained in the delete command data, whether there is data having the same value of the column in the sliding window (1802). If the result of the judgment step (1802) indicates no data, the process is terminated (1805). If the result of the judgment step (1802) indicates that there is one or a plurality of data sets, all data is deleted (1803), and if necessary, the aggregate operation is executed again (1804) to thereafter terminate the process (1805).

Next, a modification of the second embodiment will be described. In the second embodiment, the individual query master repository and the like are additionally used to process the individual query on the basis of the first embodiment. In the modification, in the structure of the first embodiment, the individual query is processed similar to the common query if an increase in busy wait of the distributed computer 102 is permitted.

In the modification, a query is registered in the position information processing system 101 in accordance with the process flow illustrated in FIG. 20. Although the main operation of the process flow illustrated in FIG. 20 is similar to that of the process flow of the first embodiment illustrated in FIG. 3, after the start of a query registration process (301), it is first judged whether a query is an individual query (2002), and if the query is the individual query, the individual query is registered in common query storage areas of all distributed computers (302).

Other points are similar to the first embodiment.

<Third Embodiment>

The third embodiment describes an example of a stock price transaction monitoring system. In the first and second embodiments, the management computer 103 processes data from mobile terminals among a plurality of distributed computers. In a first modification, description will be made on a process of dealing with a change in a distribution threshold value between a plurality of distributed computers of a stock price transaction monitoring system.

Figure 19:
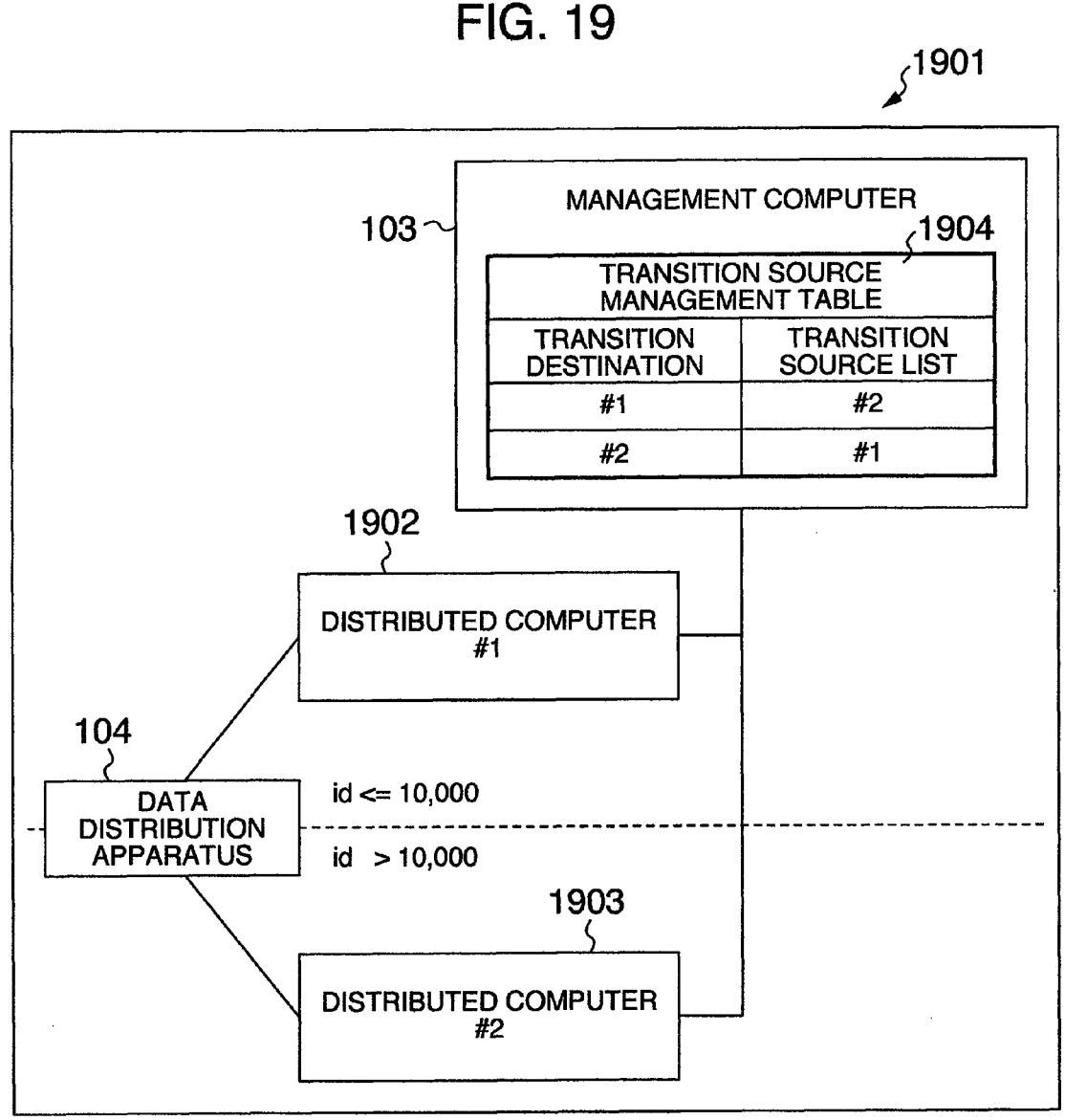
FIG. 19 is a diagram illustrating the whole structure of a third embodiment.

FIG. 19 illustrates a stock price transaction monitoring system 1901. The transaction monitoring system 1901 is a computer system equipped with a management computer 103, distributed computers 1902 and 1903 and a data distribution apparatus 104. In order to distribute a load, two distributed computers 1902 and 1903 perform calculations. Similar to the first embodiment, the data distribution apparatus 104 distributes data to two distributed computers. A distribution destination is determined in accordance with whether id (identifier) representative of a stock brand name is larger than 10,000.

Similar to the second embodiment, a transition source management table 1209 and an individual query are managed by a management computer 103. Although the structure of the management computer 103 is similar to the second embodiment, constituent elements other than the transition source management table are omitted to simplify the drawing. In actual, the management computer has a CPU, a main storage, a storage and a network interface, and is connected to the distributed computers via a network. The main storage stores a transition source management table management module, a query transmission management module, and a sliding window transmission management module, the storage stores a transition source management table, a distributed computer list and an individual query master repository, and each of the management modules and transmission module on the main storage is executed by CPU.

The distributed computers 1902 and 1903 have the structure illustrated in FIG. 22 or 23.

In the stock price transaction monitoring system 1901, data is distributed by using the id column representative of a stock brand name. This distribution is distribution by a foreign key of RDB so that during a steady running, data will not passed between a plurality of computers as in the case of the second embodiment. However, if unbalance occurs between the loads of the distributed computer #1 1902 and distributed computer #2 1903, the distribution destination by the data distribution apparatus 104 is changed to balance the load. For example, if a load of the distributed computer #1 1902 becomes high, data to be distributed to the computer #1 1902 is determined by id <=8,000 and data to be distributed to the computer #2 1903 is determined by id >8,000 so that the load is able to be balanced. Similar to the second embodiment, this load balancing process changes data processing assignment having the same foreign key value among a plurality of distributed computers, and transfers the relevant query and sliding window among the distributed computer #1 1902 and distributed computer #2 1903.

The above-described embodiments are applicable to the entirety of data processing using a plurality of computers, particularly to stream data processing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising:
    a first computer having a first memory and being capable of executing a query; and
    a second computer having a second memory and being capable of executing said query,
    wherein said first computer:
    when stream data is received from an external device via a network, said query is to be executed and said stream data is to be processed based on said query, judges whether information on a sliding window used for processing said stream data exists on said first memory;
    if said information on said sliding window exists on said first memory, executes processing of said stream data based on said query using said information on said sliding window; and
    if said information on said sliding window does not exist on said first memory, transmits an identifier contained in said received stream data to said second computer;
    receives from said second computer said information on sliding window corresponding to said identifier; and
    executes processing of said stream data based on said query using said information on sliding window received from said second computer,
    wherein said second computer transmits said information on said sliding window corresponding to said identifier received from said first computer.

2. The computer system according to claim 1, wherein:
    said information on said sliding window includes a query name and a content of said sliding window.

3. The computer system according to claim 1, wherein said second computer further searches said second memory to check whether said information on said sliding window exists on said second memory, by using said identifier transmitted from said first computer.

4. The computer system according to claim 1, wherein said second computer deletes said information on said sliding window from said second memory.

5. The computer system according to claim 1, wherein said second computer dumps a window of an object for execution regarding said query to prepare said content of said sliding window.

6. The computer system according to claim 1, wherein said identifier is an identifier designated by "partition by" defined in said query.

7. The computer system according to claim 1, further comprising:
    at least one additional second computer, so that a plurality of said second computers which include said second computer and said at least one additional second computer are provided in the computer system;
    wherein if an identifier contained in said stream data as a processing target of said query to be executed by said first computer is same as an identifier contained in said stream data as a processing target of said query to be executed by any of said second computers, said first computer acquires said information on said sliding window from said second computer.

8. The computer system according to claim 7, wherein said second computer deletes said information on said sliding window from said second memory.

9. The computer system according to claim 7, wherein said first computer transmits said identifier to a predetermined second computer among said plurality of second computers.

10. The computer system according to claim 1, wherein:
    an identifier contained in said stream data as a processing target of said query to be executed by said first computer is different from an identifier contained in said stream data as a processing target of said query to be executed by said second computer; and
    said first computer acquires information necessary for said query executable by said second computer from said second computer, and executes a same query as said query executable by said second computer, relative to said stream data identified by a different identifier.

11. The computer system according to claim 1, further comprising a management computer connected to said first computer and said second computer, wherein:
    for each identifier contained in stream data transmitted from said external device, said management computer determines said first computer or said second computer as a computer for processing said data.

12. The computer system according to claim 1, further comprising:
    at least one additional second computer so that a plurality of said second computers are provided in the computer system;
    wherein the computer system further comprises a management computer connected to said first computer and said second computers; and wherein said management computer notifies said first computer as to which one of said plurality of second computers an inquiry containing said identifier is issued.

13. The computer system according to claim 1, wherein said external device is a mobile terminal, said identifier is assigned to each mobile terminal, and said stream data contains position information of said mobile terminal related to said identifier.

14. The computer system according to claim 1, wherein said information on said sliding window is data received from said external device and a result of executing said query.

15. A first computer comprising:
a network interface to be connected to a network;
a processor connected to said network interface; and
a memory connected to said processor,
wherein:
said memory stores a query;
said network interface being capable of receiving data from an external device via said network;
when a tuple is received from said external device via said network interface, said processor judges whether information on a sliding window corresponding to said query to be executed by said processor exists on said memory;
if said information on said sliding window exists, said processor executes said query by using said sliding window and said received tuple; and
if said information on said sliding window does not exist, said processor transmits an identifier contained in said received tuple to a second computer capable of executing the query via said network interface;
said processor receives said information on said sliding window necessary for executing said query from said second computer;
said processor receives said information on said received sliding window; and
said processor executes said query based on said information on said sliding window.

16. The first computer according to claim 15, wherein:
a query stored in said first computer and a query stored in said second computer execute a same operation; and
when an acquisition request for said information on said sliding window is received from said second computer, said first computer transmits said information corresponding to the acquisition request to said second computer via said network interface, and deletes said information on said sliding window from said memory.

17. The first computer according to claim 15, wherein:
a query stored in said first computer and a query stored in said second computer execute different operations; and
said processor acquires a query stored in said second computer and said information on sliding window corresponding to the query stored in said second computer from said second computer via said network interface.

18. A query distributed processing method for a computer system having a first computer having a first memory and being capable of executing a query, and a second computer having a second memory and being capable of executing said query, the query distributed processing method comprising the following steps to be performed by said first computer:
when stream data is received from an external device via a network, said query is to be executed and said stream data is to be processed based on said query, judging whether information on a sliding window used for processing said stream data exists on said first memory;
if said information on said sliding window exists on said first memory, executing processing of said stream data based on said query using said information on said sliding window; and
if said information on said first sliding window does not exist on said first memory, transmitting an identifier contained in said received stream data to said second computer;
receiving from said second computer said information on sliding window corresponding to said identifier; and
executing processing of said stream data based on said query using said information on sliding window received from said second computer,
wherein said second computer transmits said information on said sliding window corresponding to said identifier received from said first computer.

19. The query distributed processing method according to claim 18,
wherein said information on said sliding window includes a query name and a content of said sliding window.

20. The query distributed processing method according to claim 18, further comprising:
said second computer searching said second memory to check whether said information on said sliding window exists on said second memory, by using said identifier transmitted from said first computer.

* * * * *